(12) United States Patent
Noh et al.

(10) Patent No.: US 10,254,608 B2
(45) Date of Patent: Apr. 9, 2019

(54) DISPLAY DEVICE

(71) Applicant: Samsung Display Co., Ltd., Yongin, Gyeonggi-do (KR)

(72) Inventors: Jung Hun Noh, Yongin-si (KR); Masataka Kano, Hwaseong-si (KR); Yeon Keon Moon, Seoul (KR); Keun Kyu Song, Seongnam-si (KR); Jun Ho Song, Seongnam-si (KR); Hyun Sup Lee, Hwaseong-si (KR); Sang Hee Jang, Bucheon-si (KR); Byung Seok Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 10 days.

(21) Appl. No.: 15/064,378

(22) Filed: Mar. 8, 2016

(65) Prior Publication Data
US 2017/0052417 A1 Feb. 23, 2017

(30) Foreign Application Priority Data
Aug. 21, 2015 (KR) .................. 10-2015-0118079

(51) Int. Cl.
*G02F 1/1343* (2006.01)
*G02F 1/1362* (2006.01)

(52) U.S. Cl.
CPC ...... *G02F 1/136227* (2013.01); *G02F 1/1343* (2013.01); *G02F 1/136209* (2013.01); *G02F 1/134363* (2013.01); *G02F 2001/134372* (2013.01)

(58) Field of Classification Search
CPC .......... G02F 1/136209; H01L 27/1255; H01L 29/78633
See application file for complete search history.

(56) References Cited

U.S. PATENT DOCUMENTS

| | | | |
|---|---|---|---|
| 6,344,885 B1 | 2/2002 | Mori et al. | |
| 7,027,109 B2 * | 4/2006 | Sera .................. | G02F 1/136209 349/110 |
| 8,829,511 B2 | 9/2014 | Hsieh et al. | |
| 8,853,684 B2 | 10/2014 | Endo et al. | |

(Continued)

FOREIGN PATENT DOCUMENTS

TW 201035658 A * 10/2010 ........... C07D 201/16

*Primary Examiner* — Michael H Caley
*Assistant Examiner* — Jonathan Y Jung
(74) *Attorney, Agent, or Firm* — Innovation Counsel LLP

(57) ABSTRACT

Provided is a display device.
The display device includes: a substrate; a light blocking pattern disposed on the substrate; a semiconductor pattern disposed on the light blocking pattern; a gate insulating layer disposed on the semiconductor pattern; a gate wiring; an interlayer insulating layer formed on the gate wiring; a first contact hole for exposing the source area; a data wiring disposed to extend in the second direction on the interlayer insulating layer and electrically connected to the source area via the first contact hole; a first passivation layer disposed on the data wiring; a second contact hole, which is disposed between the neighboring protrusion portions of the light blocking pattern so as not to overlap the light blocking pattern, and exposes the drain area; and a pixel electrode disposed on the first passivation layer and electrically connected to the drain area through the second contact hole.

18 Claims, 19 Drawing Sheets

(56) References Cited

U.S. PATENT DOCUMENTS

| | | | |
|---|---|---|---|
| 2003/0025848 A1* | 2/2003 | Sera | G02F 1/136209 |
| | | | 349/43 |
| 2007/0034879 A1* | 2/2007 | Park | H01L 27/12 |
| | | | 257/72 |
| 2009/0231532 A1* | 9/2009 | Yoshida | G02F 1/1345 |
| | | | 349/151 |
| 2009/0268145 A1* | 10/2009 | Anjo | G02F 1/134363 |
| | | | 349/141 |
| 2013/0088460 A1 | 4/2013 | Ahn et al. | |
| 2014/0027764 A1 | 1/2014 | Yamazaki et al. | |
| 2014/0291670 A1 | 10/2014 | Yamada et al. | |
| 2014/0329365 A1 | 11/2014 | Yamazaki et al. | |
| 2015/0144915 A1* | 5/2015 | Lee | G02F 1/1309 |
| | | | 257/40 |
| 2016/0209719 A1* | 7/2016 | Yamaguchi | G02F 1/136209 |
| 2017/0123250 A1* | 5/2017 | Wada | G02F 1/1368 |
| 2017/0338252 A1* | 11/2017 | Lee | H01L 27/1255 |

\* cited by examiner

DISPLAY DEVICE

CROSS-REFERENCE TO RELATED APPLICATIONS

This application claims priority to Korean Patent Application No. 10-2015-0118079 filed on Aug. 21, 2015 in the Korean Intellectual Property Office, the disclosure of which is incorporated herein by reference in its entirety.

BACKGROUND

1. Field

The present inventive concept relates to a display device.

2. Description of the Related Art

A liquid crystal display device, which is one of currently widely useful display devices, operates in a manner such that voltage is applied to electrodes (a pixel electrode and a common electrode) formed on two substrates facing each other to control the alignment of liquid crystal molecules in a liquid crystal layer interposed between the two substrates, thereby adjusting the amount of transmitted light.

Such a liquid crystal display device includes a thin film transistor connected to the pixel electrodes. The thin film transistor is utilized as a switching element for independently driving individual pixels in the liquid crystal display device.

Specifically, the thin film transistor is a switching element for controlling data signals transmitted to the pixel electrode through data lines in response to gate signals transmitted through gate lines at individual pixels, and includes a gate electrode connected to the gate lines, an active layer (a semiconductor layer) for forming a channel, a source electrode connected to the data lines, and a drain electrode spaced apart from the source electrode with the active layer interposed therebetween in a plan view.

The thin film transistor may include, for example, a bottom gate type thin film transistor and a top gate type thin film transistor, depending on the position of the gate electrode with respect to the active layer. A bottom gate type thin film transistor is configured such that the gate electrode is located under the active layer, and a top gate type thin film transistor is configured such that the gate electrode is located on the active layer.

Furthermore, since the top gate type thin film transistor is configured such that the gate electrode is located on the active layer, light emitted from a backlight unit that is positioned under the substrate may have an influence on the active layer. Therefore, the liquid crystal display device including the top gate type thin film transistor may further include a light blocking layer for blocking the introduction of light into the active layer from the backlight unit.

However, the light blocking layer is disposed in floating state that is not electrically connected to a voltage source, and thus may cause parasitic capacitance with peripheral constituents, for example, the gate electrode, the source electrode or the drain electrode, due to static electricity. Such parasitic capacitance may deteriorate the characteristics of the thin film transistor as a switching element, undesirably degrading the operational reliability of a display device.

SUMMARY

Aspects of the present inventive concept provide a display device, which may reduce the formation of parasitic capacitance to thus increase the operational reliability of a desired display device.

However, aspects of the present inventive concept are not restricted to the one set forth herein. The above and other aspects of the present inventive concept will become more apparent to one of ordinary skill in the art to which the present inventive concept pertains by referencing the detailed description of the present inventive concept given below.

In accordance with one embodiment, a display device includes: a substrate; a light blocking pattern disposed on the substrate and including a coupling portion extending in a first direction and a plurality of protrusion portions protruding in a second direction crossing the first direction from the coupling portion; a semiconductor pattern disposed on the light blocking pattern and including a source area, a channel area and a drain area; a gate insulating layer disposed on the semiconductor pattern; a gate wiring including a gate line extending in the first direction on the gate insulating layer and a gate electrode overlapping the channel area; an interlayer insulating layer formed on the gate wiring; a first contact hole for exposing the source area through the interlayer insulating layer; a data wiring extending in the second direction on the interlayer insulating layer and electrically connected to the source area via the first contact hole; a first passivation layer disposed on the data wiring; a second contact hole, which is disposed between the neighboring protrusion portions of the light blocking pattern so as not to overlap the light blocking pattern, and exposes the drain area through the interlayer insulating layer and the first passivation layer; and a pixel electrode disposed on the first passivation layer and electrically connected to the drain area through the second contact hole.

The semiconductor layer may include: a first portion, which includes the source area, the channel area, and a portion of the drain area, and overlaps the data wiring; and a second portion, which forms another portion of the drain area, extends the first direction, and is connected to the first portion.

The semiconductor layer may further include a third portion, which forms the another portion of the drain area, extends in the second direction, and faces the first portion.

The light blocking pattern may further include a light blocking recess recessed from an edge of the light blocking pattern, the gate wiring further includes a gate recess recessed from an edge of the gate wiring and the gate electrode and overlapping the light blocking recess, and the second contact hole overlaps the gate recess and the light blocking recess.

The light blocking pattern may further include a connection terminal extending in the first direction from the coupling portion to a non-display area.

The display device may further include: a planarization layer disposed between the first passivation layer and the pixel electrode; a common wiring disposed to be insulated from the pixel electrode and including a connection portion; a second passivation layer disposed between the common wiring and the pixel electrode; a third contact hole for exposing the connection terminal through the second passivation layer, the planarization layer, the first passivation layer, and the interlayer insulating layer; a fourth contact hole for exposing the connection portion through the second passivation layer; and a bridge electrode disposed on the same layer as the pixel electrode, and disposed to electrically connect the connection terminal and the connection portion through the third contact hole and the fourth contact hole.

The display device may further includes: a planarization layer disposed between the first passivation layer and the pixel electrode; a common wiring disposed to be insulated from the pixel electrode and including a connection portion; and a third contact hole for exposing the connection terminal through the planarization layer, the first passivation layer, and the interlayer insulating layer, wherein the connection portion is electrically connected to the connection terminal through the third contact hole.

The display device may further includes: a buffer layer disposed between the light blocking pattern and the semiconductor layer; a planarization layer disposed between the first passivation layer and the pixel electrode; a common wiring disposed to be insulated from the pixel electrode and including a connection portion; a third contact hole for exposing the connection terminal through the buffer layer; a bridge electrode disposed on the same layer as the gate wiring and electrically connected to the connection terminal through the third contact hole; and a fourth contact hole for exposing the bridge electrode through the planarization layer, the first passivation layer, and the interlayer insulating layer, wherein the connection portion is electrically connected to the bridge electrode through the fourth contact hole.

The display device may further includes: a buffer layer disposed between the light blocking pattern and the semiconductor layer; a planarization layer disposed between the first passivation layer and the pixel electrode; a common wiring disposed to be insulated from the pixel electrode and including a connection portion; a third contact hole for exposing the connection terminal through the buffer layer and the interlayer insulating layer; a bridge electrode disposed on the same layer as the data wiring and electrically connected to the connection terminal through the third contact hole; and a fourth contact hole for exposing the bridge electrode through the planarization layer and the first passivation layer, wherein the connection portion is electrically connected to the bridge electrode through the fourth contact hole.

The light blocking pattern may be formed of a metal material.

The first contact hole may overlap the source area and the data wiring.

In accordance with another embodiment, a display device may include: a substrate including a display area including a plurality of pixels arranged in a matrix shape in a first direction and a second direction perpendicular to the first direction; a light blocking pattern disposed at each row of the pixels on the substrate; a first insulating layer disposed on the light blocking pattern; a common electrode to which a common voltage is applied; and a pixel electrode, which is disposed at each of the pixels on the first insulating layer and to which a pixel voltage is applied, wherein the light blocking pattern includes a coupling portion extending in the first direction and a plurality of protrusion portions protruding in the second direction from the coupling portion, and wherein the common voltage is applied to the light blocking pattern.

The display device may further include a first contact hole for exposing the light blocking pattern through the first insulating layer outside the display area, wherein the light blocking pattern is electrically connected to the common electrode through the first contact hole.

The display device may further include: a second insulating layer disposed between the common electrode and the pixel electrode; a common wiring, which is disposed on the same layer as the common electrode outside the display area, includes a connection portion, and is electrically connected to the common electrode; a second contact hole for exposing the connection portion through the second insulating layer; and a bridge electrode formed of the same layer as the pixel electrode and configured to connect the light blocking pattern and the connection portion through the first contact hole and the second contact hole.

The light blocking pattern may further include a connection terminal extending from the coupling portion along the first direction to outside the display area and exposed by the first contact hole, and the connection terminal is electrically connected to the bridge electrode.

The display device may further include: a second insulating layer disposed between the common electrode and the pixel electrode; and a common wiring, which is disposed on the same layer as the common electrode outside the display area, includes a connection portion, and is electrically connected to the common electrode, a second contact hole for exposing the connection portion through the second insulating layer; and a bridge electrode formed of the same layer as the pixel electrode and configured to connect the light blocking pattern and the connection portion through the first contact hole and the second contact hole.

The light blocking pattern may further include a connection terminal extending from the coupling portion along the first direction to outside the display area and exposed by the first contact hole, and the connection terminal is electrically connected to the bridge electrode.

The light blocking pattern may further include a second insulating layer disposed between the common electrode and the pixel electrode; and a common wiring, which is disposed on the same layer as the common electrode and disposed outside the display area, including a connection portion and being electrically connected to the common electrode, wherein the light blocking pattern is electrically connected to the connection portion through the first contact hole.

The light blocking pattern may further include a connection terminal extending from the coupling portion along the first direction to outside the display area and exposed by the first contact hole, and the connection terminal is electrically connected to the connection portion.

The light blocking pattern may be formed of a metal material.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE EMBODIMENTS

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims.

It will also be understood that when a layer is referred to as being "on" another layer or substrate, it can be directly on the other layer or substrate, or intervening layers may also be present. The same reference numbers indicate the same components throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

Hereinafter, embodiments of the present inventive concept will be described in detail with reference to the attached drawings.

Figure 1:
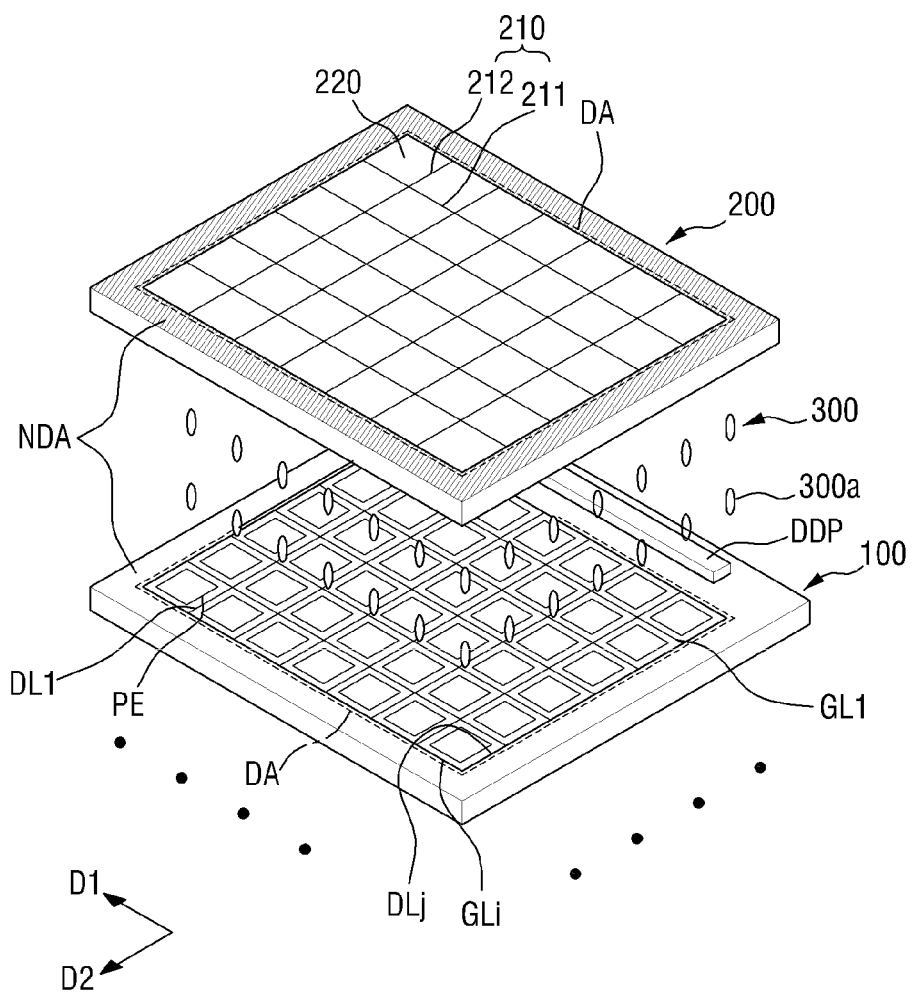
FIG. 1 is an exploded perspective view schematically illustrating a display device according to an embodiment of the present inventive concept.

FIG. 1 is an exploded perspective view schematically illustrating a display device according to an embodiment of the present inventive concept.

With reference to FIG. 1, the display device 500 according to an embodiment of the present inventive concept may comprise a first display substrate 100, a second display substrate 200 facing the first display substrate 100, and a liquid crystal layer 300 interposed between the first display substrate 100 and the second display substrate 200.

Each of the display substrates 100, 200 includes a display area DA and a non-display area NDA. The display area DA may be defined by a plurality of pixels arranged in a matrix shape along a first direction D1 (or a row direction) and a second direction D2 (or a column direction) crossing (or perpendicular to) the first direction D1. Also, the display area DA includes a plurality of gate wirings GL1 to GLi and a plurality of data wirings DL1 to DLj.

The gate wirings GL1 to GLi and the data wirings DL1 to DLj are arranged to cross each other while being insulated from each other. The gate wirings GL1 to GLi extend in the first direction D1 and are spaced apart from each other in the second direction D2. The gate wirings GL1 to GLi may be connected to a gate driving part (not shown) disposed in the non-display area NDA to thus receive sequential gate signals. The data wirings DL1 to DLj extend in the second direction D2 and are spaced apart from each other in the first direction D1. The data wirings DL1 to DLj may be connected to a data driving part DDP disposed in the non-display area NDA to thus receive data voltages.

Figure 3:
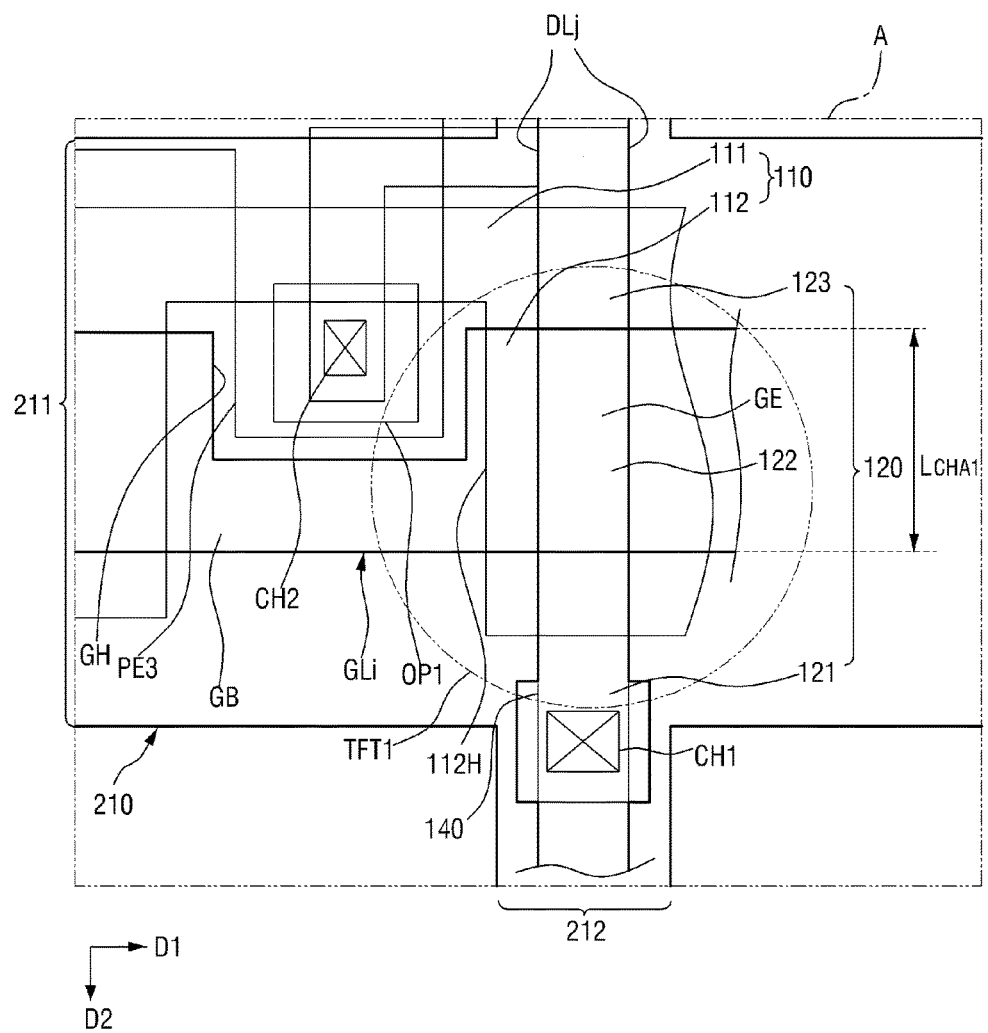
FIG. 3 is an enlarged layout view of Part 'A' of FIG. 2.

A pixel electrode PE may be disposed at each of pixels in the display area DA of the first display substrate 100. The pixel electrode PE may receive data voltage supplied through the corresponding data wiring among the data wirings DL1 to DLj in response to the gate signal transmitted through the corresponding gate wiring among the gate wirings GL1 to GLi via the thin film transistor TFT1 (FIG. 3). Also, a common electrode (CE of FIG. 5), which is integrally formed regardless of the pixels, may be disposed in the front surface of the display area DA of the first display substrate 100. The pixel electrode PE and the common electrode (CE of FIG. 5) may produce an electric field together, so that the alignment direction of the liquid crystal molecules 300a in the liquid crystal layer 300 interposed therebetween may be controlled.

In the non-display area NDA of the first display substrate 100, a gate driving part (not shown) for transmitting gate signals to respective pixels of the display area DA and a data driving part DDP for applying data voltage may be disposed.

In the display area DA of the second display substrate 200, a color filter 220 may be formed at each of the pixels. The color filter 220 may include any one among a red color filter, a green color filter, and a blue color filter. The red color filter, the green color filter, and the blue color filter may be alternately arranged. Also, light blocking members 210 may be disposed at boundaries between individual color filters 220. Further, the light blocking members 210 may be disposed in the non-display area NDA of the second display substrate 200, and may include first light blocking portions 211 and second light blocking portions 212, which cross each other.

The first display substrate 100 and the second display substrate 200 may be attached each other using a sealing member (not shown) made of a sealant. The sealing member may be provided around the first display substrate 100 and the second display substrate 200, and may be positioned on the non-display area NDA.

Figure 2:
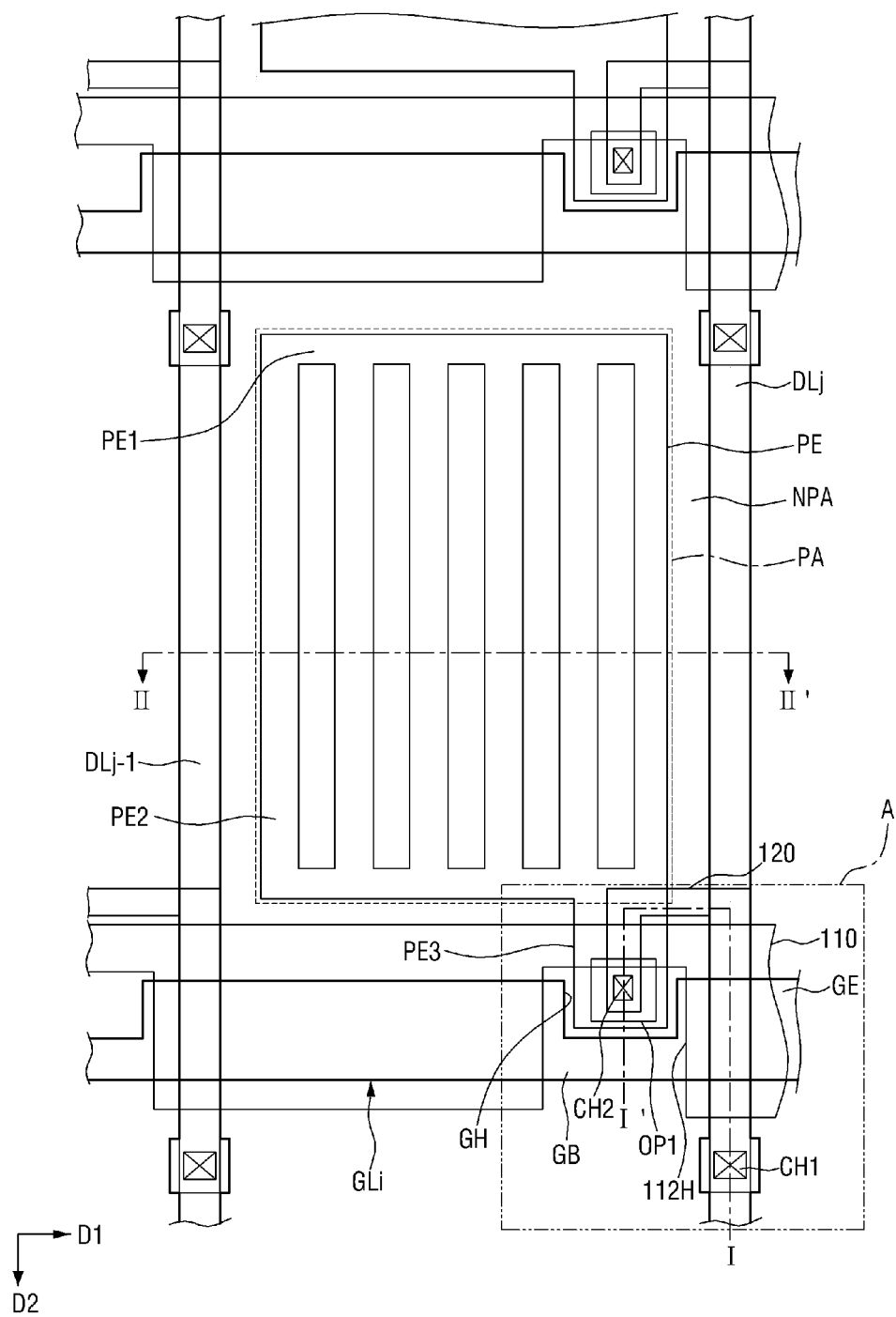
FIG. 2 is a layout view of the pixel of FIG. 1.
Figure 4:
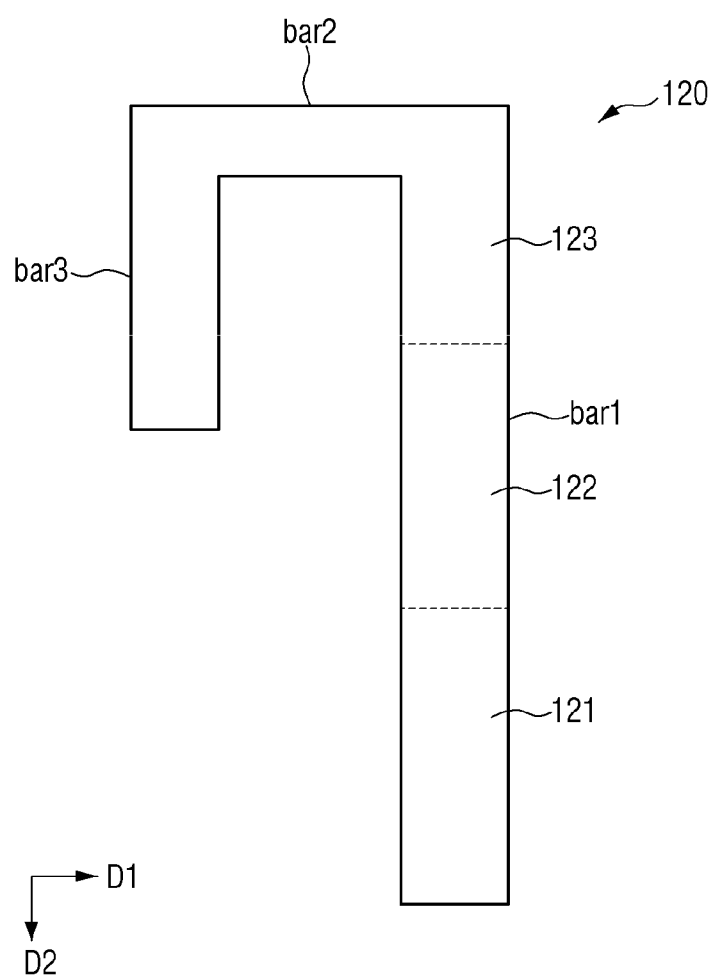
FIG. 4 is a top plan view illustrating the semiconductor pattern of FIG. 3.
Figure 5:
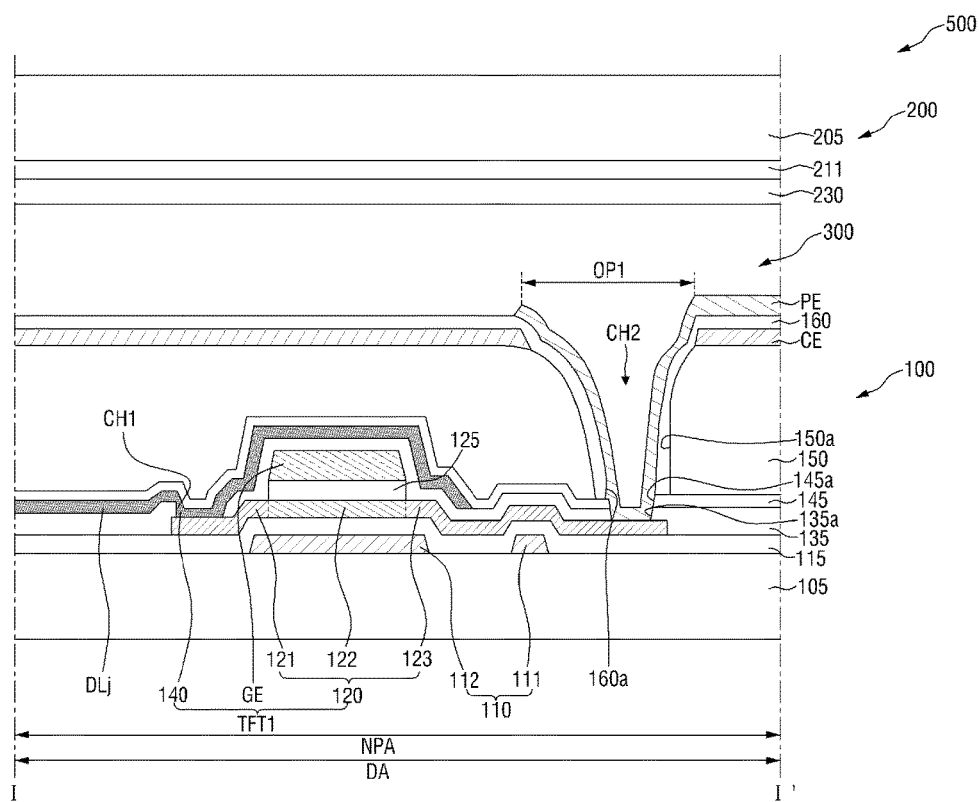
FIG. 5 is a cross-sectional view taken along the line I-I' of FIG. 2.
Figure 6:
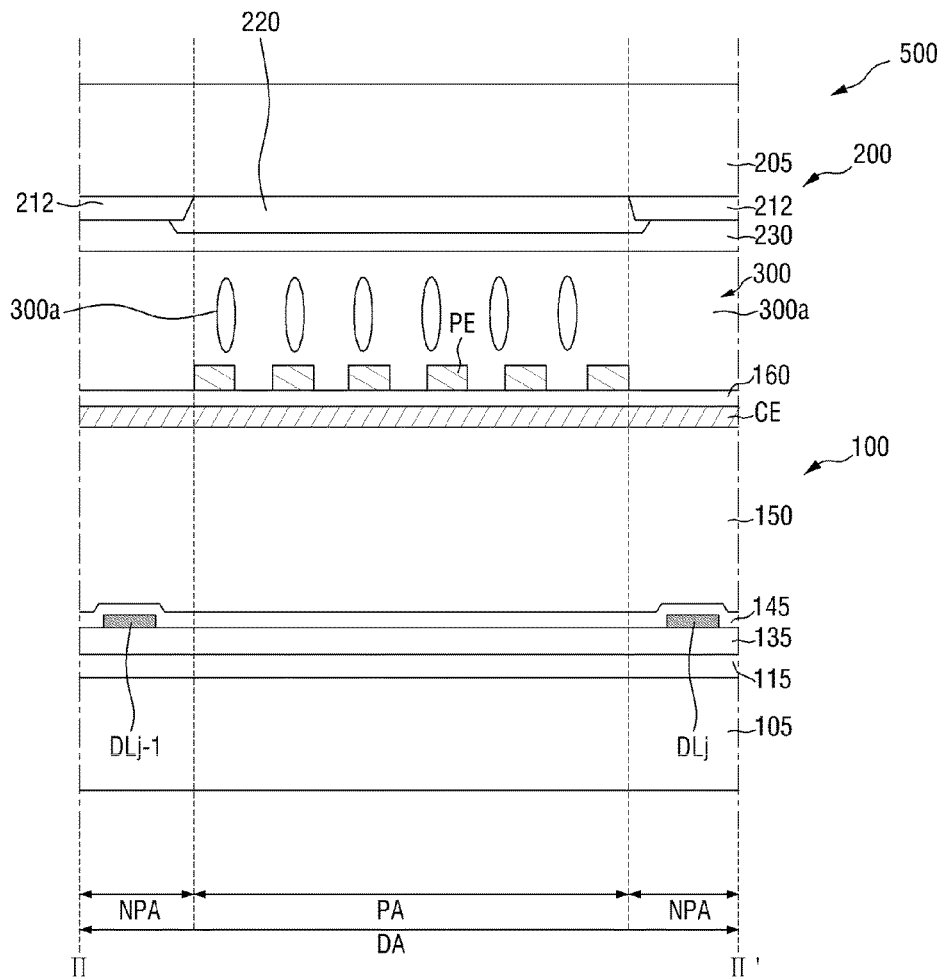
FIG. 6 is a cross-sectional view taken along the line II-II' of FIG. 2.

FIG. 2 is a layout view of the pixel of FIG. 1, FIG. 3 is an enlarged layout view of Part 'A' of FIG. 2, FIG. 4 is a top plan view illustrating the semiconductor pattern of FIG. 3, FIG. 5 is a cross-sectional view taken along the line I-I' of FIG. 2, and FIG. 6 is a cross-sectional view taken along the line II-II' of FIG. 2.

For individual pixels of the display device 500, a pixel is exemplarily described in detail. To this end, FIGS. 2 to 6 show the structure of a pixel. FIG. 3 also illustrates the light blocking member 210 to depict the configuration between Part 'A' of FIG. 2 and the light blocking member 210.

With reference to FIGS. 2 to 6, a pixel includes a pixel area PA and a non-pixel area NPA around the pixel area PA when viewed from above. The pixel area PA is defined as an area where an image is displayed, and the non-pixel area NPA may be defined as an area where an image is not displayed.

Specifically, the first display substrate 100 includes a first substrate 105, a light blocking pattern 110, a buffer layer 115, a semiconductor pattern 120, a gate insulating layer 125, a gate wiring GLi, an interlayer insulating layer 135, a data wiring DLj, a first passivation layer 145, a planarization layer 150, a common electrode CE, a second passivation layer 160, and a pixel electrode PE.

The first substrate 105 may include a display area DA in which pixels are disposed and a non-display area (NDA of FIG. 1) around the display area DA. The display area DA includes pixel areas PA and a non-pixel area NPA between the pixel areas PA. The first substrate 105 may include a material having high transparency, heat resistance, and chemical resistance. For example, the first substrate 105 may include any one among glass, polyethylene naphthalate, polyethylene terephthalate, and polyacryl, having high light permeability.

The light blocking pattern 110 is disposed at each row of the pixels on the first substrate 105, and is disposed in the non-pixel area NPA of the pixel. The light blocking pattern 110 may include a coupling portion 111 extending in the first direction D1 and protrusion portions 112 protruding in the second direction D2 from the coupling portion 111.

The coupling portion 111 may receive the common voltage through the common wiring (CL of FIG. 7), so that the light blocking pattern 110 may be maintained at constant voltage. Accordingly, the coupling portion 111 is responsible for reducing the formation of parasitic capacitance between the light blocking pattern 110 and the peripheral constituents, for example, the gate electrode GE, and the source area 121 or the drain area of the semiconductor pattern 120, due to static electricity. Thus, reliability of the display device 500 may be prevented from decreasing due to deterioration of the characteristics of the thin film transistor TFT1 as a switching element on account of parasitic capacitance. Also, the electrical connection structure of the common wiring (CL of FIG. 7) and the light blocking pattern 110 configured to be maintained at constant voltage is described later.

The protrusion portion 112 may overlap some of the data wiring DLj, and may prevent light emitted from a backlight unit (not shown) from entering the channel area 122 of the semiconductor pattern 120 through the first substrate 105. Thus, deterioration of characteristics of the thin film transistor TFT1 due to light irradiation to the channel area 122 of the semiconductor pattern 120 may be prevented. Meanwhile, the light blocking pattern 110 may further include a light blocking recess 112H recessed from an edge of the light blocking pattern and disposed between the protrusion portions 112 overlapping the adjacent data wirings DLj−1, DLj. The light blocking recess 112H may be formed in a region corresponding to a contact hole CH2 to overlap the contact hole CH2 as will be described later, namely, a contact hole for connecting the drain area 123 of the semiconductor pattern 120 and the pixel electrode PE.

The light blocking pattern 110 may be formed of opaque material. The light blocking pattern 110 may be a metal selected from the group consisting of molybdenum (Mo), chromium (Cr), copper (Cu), tantalum (Ta), and aluminum (Al).

The buffer layer 115 is disposed in the display area DA and the non-display area (NDA of FIG. 1) of the first substrate 105. The buffer layer 115 may be disposed to cover the light blocking pattern 110 on the first substrate 105. The buffer layer 115 may be formed of an insulating material, for example, silicon nitride or silicon oxide.

The semiconductor pattern 120 is disposed in the non-pixel area NPA of the first substrate 105. The semiconductor pattern 120 may be disposed so as to partially overlap the light blocking pattern 110 and the data wiring DLj on the buffer layer 115.

The semiconductor pattern 120 may be formed of amorphous silicon or polycrystalline silicon. Also, the semiconductor pattern 120 may be formed of an oxide semiconductor material. The oxide semiconductor material may be exemplified by an oxide containing oxygen (O) and one or more elements selected from among gallium (Ga), indium (In), zinc (Zn), and tin (Sn). Specifically, the oxide semiconductor material may include any one selected from among ZnO (Zinc Oxide), IZO (Indium Zinc Oxide), ITO (Indium Tin Oxide), and IGZO (Indium Gallium Zinc Oxide).

The semiconductor pattern 120 may include the source area 121, the channel area 122 and the drain area 123. The source area 121 and the drain area 123 disposed at both sides of the channel area 122 may be areas that are subjected to plasma treatment so as to increase electrical conductivity. As such, the drain area 123 may come into direct contact with the pixel electrode PE through the contact hole CH2 without an additional drain electrode, and may thus be electrically connected thereto. Accordingly, conventional deterioration of the characteristics of the thin film transistor as a switching element attributable to the formation of parasitic capacitance between the additional drain electrode and the gate electrode may be prevented. Also, the drain area 123 may overlap some of the light blocking pattern 110 and thus may operate as a storage capacitor, thereby reducing an increase in kickback voltage defined by a difference between the data voltage (pixel voltage) applied to the pixel electrode PE and the voltage that is charged in the liquid crystal layer 300.

As illustrated in FIG. 4, the semiconductor pattern 120 may have a bending structure comprising a first portion bar1, a second portion bar2 and a third portion bar3. The first portion bar1 may overlap the data wiring DLj while extending in the second direction D2 along which the data wiring DLj extends, and may be formed by the source area 121, the channel area 122 and a portion of the drain area 123. The length of the first portion bar1 in the second direction D2 may be greater than the width of the gate electrode GE. The second portion bar2 is connected to the first portion bar1 and may extend in the first direction D1, and may form another portion of the drain area 123. The third portion bar3 is connected to the second portion bar2, may extend in the second direction D2, faces the first portion bar1, and may form another portion of the drain area 123.

The gate insulating layer 125 is disposed on the semiconductor pattern 120. The gate insulating layer 125 may be formed so as to expose the source area 121 and the drain area 123 while overlapping the channel area 122 of the semiconductor pattern 120. Thus, plasma gas may be supplied to the source area 121 and the drain area 123 through the exposed area of the gate insulating layer 125 upon plasma treatment of the source area 121 and the drain area 123.

The gate wiring GLi is disposed in the non-pixel area NPA of the first substrate 105. The gate wiring GLi may include a gate line GB extending along the first direction D1, and a gate electrode GE overlapping the semiconductor pattern 120. The gate wiring GLi may include a gate recess GH recessed from an edge of the gate wiring GLi. The gate recess GH may be formed on a region corresponding to the light blocking recess 112H. The gate electrode GE may overlap the protrusion portion 112 of the light blocking pattern 110 and the channel area 122 of the semiconductor pattern 120.

The gate wiring GLi may be formed of any conductive material such as a transparent conductive material, for example, indium tin oxide (ITO), indium zinc oxide (IZO), and indium tin zinc oxide (ITZO) or a metal. Also, the gate wiring GLi may have a two-layer structure comprising a first conductive layer formed of the transparent conductive material and a second conductive layer formed of the metal. The metal may include copper (Cu), molybdenum (Mo), aluminum (Al), tungsten (W), chromium (Cr), and titanium (Ti), or an alloy containing at least one of the above metals.

The interlayer insulating layer 135 is disposed in the display area DA and the non-display area (NDA of FIG. 1) of the first substrate 105. The interlayer insulating layer 135 may be disposed on the buffer layer 115 so as to cover the gate wiring GLi and the semiconductor pattern 120. The interlayer insulating layer 135 may be formed of an insulating material, for example, silicon nitride or silicon oxide. The interlayer insulating layer 135 may further include a contact hole CH1 for exposing the source area 121 of the semiconductor pattern 120, and a through hole 135a for exposing the drain area 123.

The data wiring DLj is disposed to extend along the second direction D2 in the non-pixel area NPA of the first substrate 105, and crosses the gate wiring GLi. The data wiring DLj may be disposed on the interlayer insulating layer 135. Some of the data wiring DLj may overlap the light blocking pattern 110, the source area 121, the channel area 122 and a portion of the drain area 123 of the semiconductor pattern 120, and the gate electrode GE of the gate wiring GLi. Meanwhile, a portion of the data wiring DLj, which does not overlap the gate wiring GLi, may be defined as a source electrode area 140. The source electrode area 140 may be electrically connected to the source area 121 of the semiconductor pattern 120 through the contact hole CH1 of the interlayer insulating layer 135.

As described above, the semiconductor pattern 120, the gate electrode GE, and the source electrode area 140 may constitute the thin film transistor TFT1 that overlaps the data wiring DLj. As such, the channel length $L_{CHA1}$ of the thin film transistor TFT1 may be the same as the width of the gate wiring GLi including the gate electrode GE in the second direction D2. When the thin film transistor TFT1 is turned-on in response to the gate signal transmitted through the gate wiring GLi, the pixel voltage corresponding to the data voltage supplied through the data wiring DLj is applied to the pixel electrode PE via the thin film transistor TFT1. Accordingly, an electric field is formed between the pixel electrode PE and the common electrode CE, and the liquid crystal molecules 300a of the liquid crystal layer 300 may be driven depending on the electric field, consequently displaying an image.

The first passivation layer 145 is disposed in the display area DA and the non-display area (NDA of FIG. 1) of the first substrate 105. The first passivation layer 145 may be disposed on the interlayer insulating layer 135 so as to cover the data wiring DLj. The first passivation layer 145 may be formed of an insulating material, for example, silicon nitride or silicon oxide. The first passivation layer 145 may further include a through hole 145a for exposing the drain area 123 of the semiconductor pattern 120.

The planarization layer 150 is disposed in the display area DA and the non-display area (NDA of FIG. 1) of the first substrate 105. The planarization layer 150 may be disposed on the first passivation layer 145. The planarization layer 150 may be formed of an organic insulating material, for example, acrylic epoxy silicon. The planarization layer 150 may further include a through hole 150a for exposing the drain area 123 of the semiconductor pattern 120.

The common electrode CE is disposed on the entire surface of the planarization layer 150 in the display area DA of the first substrate 105. Although not shown, the common electrode CE receives the common voltage transferred through the common wiring (CL of FIG. 7). The common electrode CE may be electrically connected to the light blocking pattern 110 via the common wiring (CL of FIG. 7). As such, when the common voltage is applied to the common electrode CE, a resistance component may be reduced. Accordingly, a ripple phenomenon, in which the common voltage applied to the common electrode CE swings when the data voltage applied to the pixel electrode PE swings, may be decreased.

The common electrode CE includes a first opening OP1 that overlaps the through hole 150a of the planarization layer 150. The first opening OP1 is a portion in which the common electrode CE is not substantially formed. The planar area of the first opening OP1 may be greater than the planar area of the through hole 150a of the planarization layer 150.

The common electrode CE may be formed of a transparent conductive material, for example, indium zinc oxide (IZO) or amorphous-indium tin oxide (a-ITO).

The second passivation layer 160 is disposed in the display area DA and the non-display area (NDA of FIG. 1) of the first substrate 105. The second passivation layer 160 may be disposed on the common electrode CE. The second passivation layer 160 may be formed of an insulating material, for example, silicon nitride or silicon oxide. The second passivation layer 160 may further include a through hole 160a for exposing the drain area 123 of the semiconductor pattern 120.

Meanwhile, the through hole 135a of the interlayer insulating layer 135, the through hole 145a of the first passivation layer 145, the through hole 150a of the planarization layer 150, and the through hole 160a of the second passivation layer 160 may form a contact hole CH2 for connecting the pixel electrode PE to the drain area 123 of the semiconductor pattern 120. The contact hole CH2 may overlap the light blocking recess 112H of the light blocking pattern 110 and the gate recess GH of the gate wiring GLi in the non-pixel area NPA of the first substrate 105. Specifically, the contact hole CH2 may be disposed parallel to the thin film transistor TFT1 in the first direction D1, and thus, the width of the first light blocking portion 211, which is disposed to overlap the light blocking pattern 110 and the gate wiring GLi, of the light blocking member 210 included in the second display substrate 200 may be prevented from being increased in the second direction D2. Accordingly, the aperture ratio of pixels may increase.

Each pixel has the pixel electrode PE which is insulated from the common electrode CE and is formed on the planarization layer 150. Specifically, the pixel electrode PE is disposed in the pixel area PA on the second passivation layer 160, and is connected to the drain area 123 of the semiconductor pattern 120 via the contact hole CH2. When viewed from above, the pixel electrode PE includes at least one stem portion PE1, a plurality of branch portions PE2 extending in a direction crossing the stem portion PE1, and an extension portion PE3 for connecting the stem portion PE1 and the drain area 123 of the semiconductor pattern 120. The branch portions PE2 are spaced apart from each other by predetermined intervals. The branch portions PE2 may be formed so as to extend parallel in a predetermined direction. The stem portion PE1 and the branch portions PE2 are not limited to the configuration illustrated in FIG. 2, and may be variously configured. For example, the branch portions PE2 may protrude unidirectionally from the stem portion PE1. Also, the branch portions PE2 may extend perpendicular to the stem portion PE1 from both sides of the stem portion PE1. Alternatively, the stem portion PE1 or the branch portions PE2 may be formed to be bent several times.

Also, the second display substrate 200 may include a second substrate 205, a light blocking member 210, a color filter 220, and an overcoating layer 230.

The second substrate 205 faces the first substrate 105. The second substrate 205 may include a material having superior transparency, heat resistance, and chemical resistance. For example, the second substrate 205 may include any one selected from among glass, polyethylene naphthalate, polyethylene terephthalate, and polyacryl, having high light permeability.

The light blocking member 210 is disposed under the second substrate 205. The light blocking member 210 may be disposed to correspond to at least some of the non-pixel area NPA of the first substrate 105. The light blocking member 210 includes first light blocking portions 211, which overlap the light blocking pattern 110, the gate wiring GLi and the thin film transistor TFT1, and second light blocking portions 212, which overlap the data wiring DLj. The light blocking member 210 is formed of a light blocking material so as to block unnecessary light when an image is displayed. For example, the light blocking member 210 may block light leakage at the edge of the liquid crystal layer 300 or color mixing at the edge of the color filter 220.

The color filter 220 is disposed under the second substrate 205. The color filter 220 is disposed to correspond to each pixel area PA of the first substrate 105, and may thus overlap the pixel electrode PE. Each color filter 220 may partially overlap or may be spaced apart at boundaries of the adjacent pixel areas PAs.

The overcoating layer 230 is formed under the light blocking member 210 and the color filter 220. The overcoating layer 230 functions to protect and insulate the color filter 220 while planarizing the color filter 220, and may be formed of an acrylic epoxy material.

Figure 7:
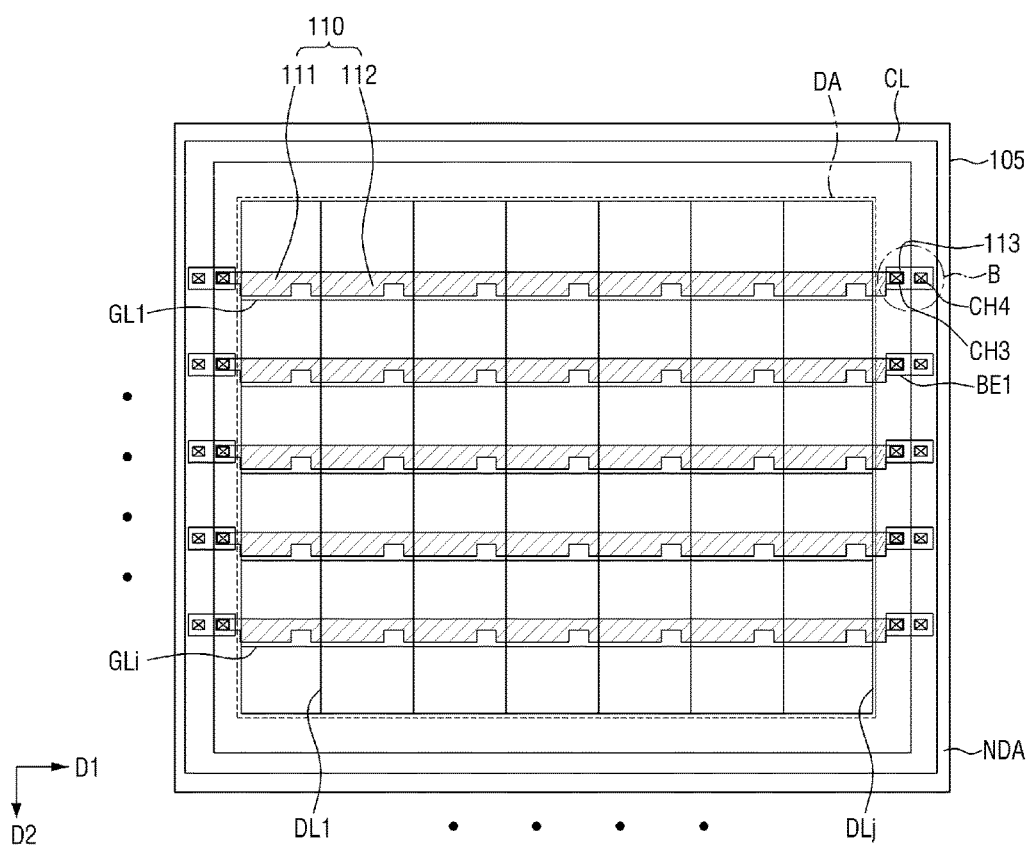
FIG. 7 is a schematic layout view illustrating the electrical connection structure between the common wiring and the light blocking pattern of FIG. 6.
Figure 8:
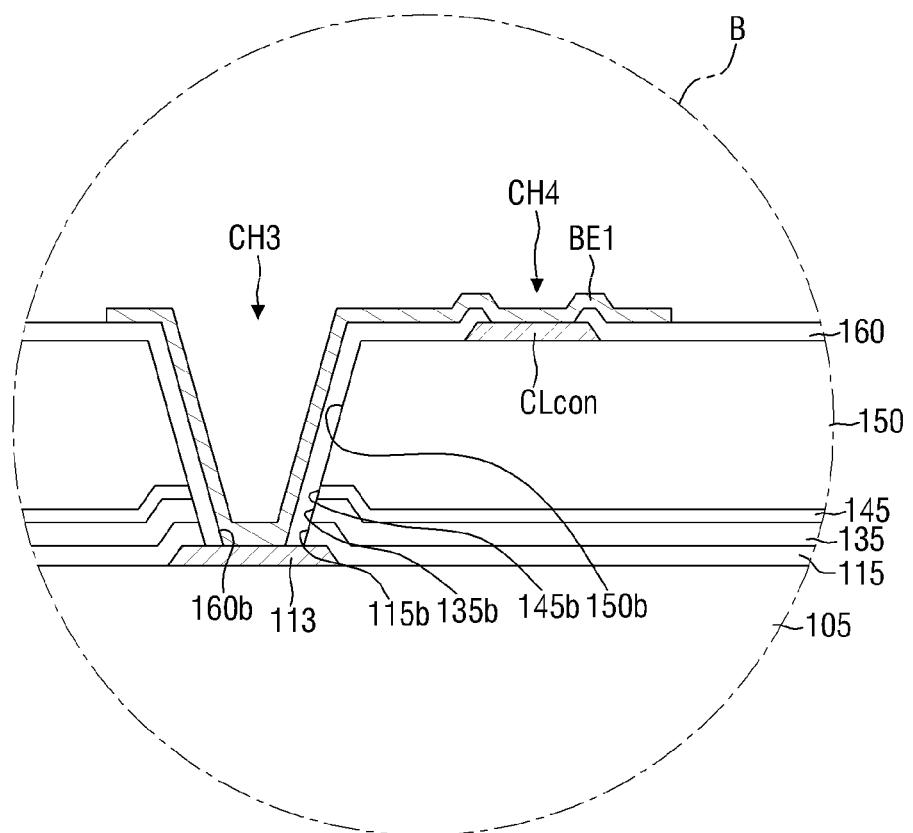
FIG. 8 is an enlarged cross-sectional view of Part 'B' of FIG. 7.

FIG. 7 is a schematic layout view illustrating the electrical connection structure of the common wiring and the light blocking pattern of FIG. 6, FIG. 8 is an enlarged cross-sectional view of Part 'B' of FIG. 7, and FIGS. 9 to 11 are cross-sectional views illustrating various examples for the electrical connection structure of the common wiring and the light blocking pattern of FIG. 8.

Below is a detailed description of the electrical connection structure of the common wiring and the light blocking pattern.

With reference to FIGS. 7 and 8, a light blocking pattern 110 is disposed at each row of the pixels. Each light blocking pattern 110 may further include a connection terminal 113 disposed in the non-display area NDA outside the display area DA of the first substrate 105. The connection terminal 113 is a portion extending from the coupling portion 111 of the light blocking pattern 110 to the first direction D1. Meanwhile, the buffer layer 115 is disposed on the first substrate 105 so as to cover the connection terminal 113 in the non-display area NDA of the first substrate 105, and may further include a through hole 115b for exposing the connection terminal 113 of the light blocking pattern 110. The interlayer insulating layer 135 is disposed on the buffer layer 115, and may further include a through hole 135b that overlaps the through hole 115b of the buffer layer 115 while exposing the connection terminal 113 of the light blocking pattern 110. The first passivation layer 145 is disposed on the interlayer insulating layer 135, and may further include a through hole 145b that overlaps the through hole 135b of the interlayer insulating layer 135 while exposing the connection terminal 113 of the light blocking pattern 110. The planarization layer 150 is disposed on the first passivation layer 145, and may further include a through hole 150b that overlaps the through hole 145b of the first passivation layer 145 while exposing the connection terminal 113 of the light blocking pattern 110.

In the non-display area NDA of the first substrate 105, the common wiring CL and the bridge electrode BE1 may be further disposed.

The common wiring CL may surround the display area DA, may be disposed in a closed loop shape on the planarization layer 150, and may be formed of a conductive material. In an example, the common wiring CL may be disposed in the same layer as the common electrode (CE of FIG. 5), and may be formed of the same material as the common electrode. The common wiring CL supplies the common voltage that is applied to the light blocking pattern 110. Meanwhile, in the non-display area NDA of the first substrate 105, the second passivation layer 160 is disposed on the planarization layer 150 so as to cover the common wiring CL. The second passivation layer 160 may further include a through hole 160b that overlaps the through hole 115b of the buffer layer 115 while exposing the connection terminal 113 of the light blocking pattern 110. The through holes 115b, 135b, 145b, 150b, 160b may form a contact hole CH3 for connecting the bridge electrode BE1 to the connection terminal 113 of the light blocking pattern 110. Also, the second passivation layer 160 may further include a contact hole CH4 for connecting the bridge electrode BE1 to the connection portion CLcon of the common wiring CL while exposing the connection portion CLcon of the common wiring CL adjacent to the connection terminal 113 of the light blocking pattern 110 in the first direction D1.

The bridge electrode BE1 may be disposed on the second passivation layer 160 so as to be electrically connected to the connection terminal 113 of the light blocking pattern 110 via the contact hole CH3 and also the connection portion CLcon of the common wiring CL via the contact hole CH4. The bridge electrode BE1 may be disposed in the same layer as the pixel electrode PE, and may be formed of the same material as the pixel electrode PE.

As described above, the light blocking pattern 110 may be electrically connected to the common wiring CL via the bridge electrode BE1. Thus, the light blocking pattern 110 receives the common voltage via the common wiring CL, so that the voltage of the light blocking pattern 110 may be maintained constant.

Figure 9:
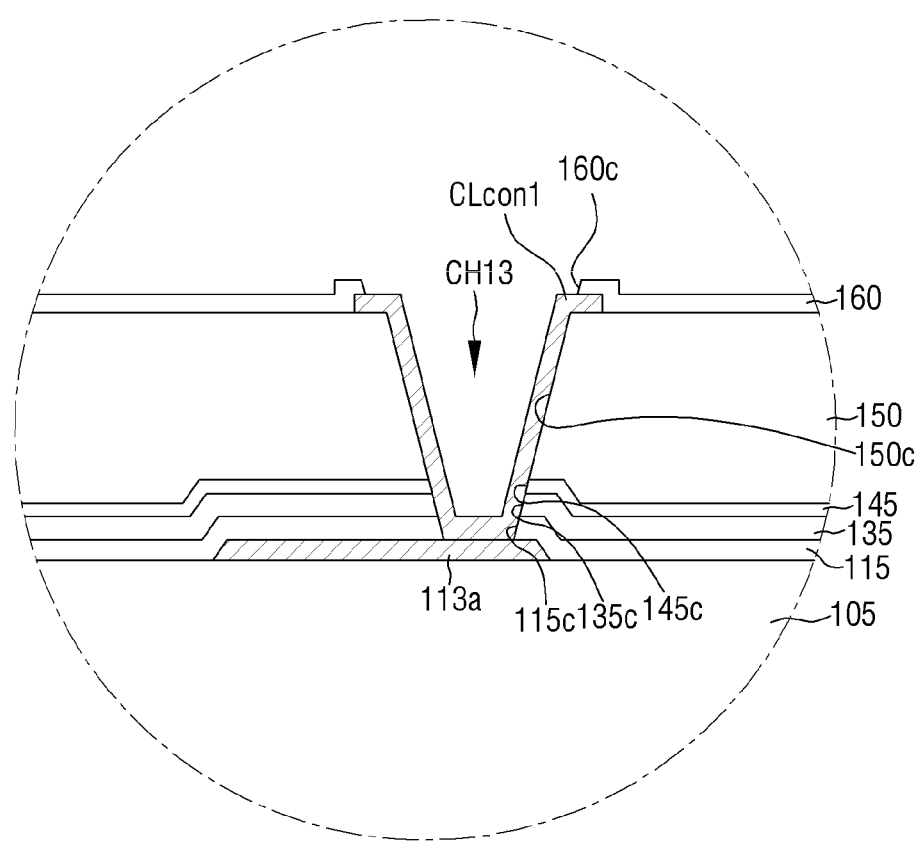
FIGS. 9, 10 and 11 are cross-sectional views illustrating various examples for the electrical connection structure between the common wiring and the light blocking pattern of FIG. 8.
Figure 10:
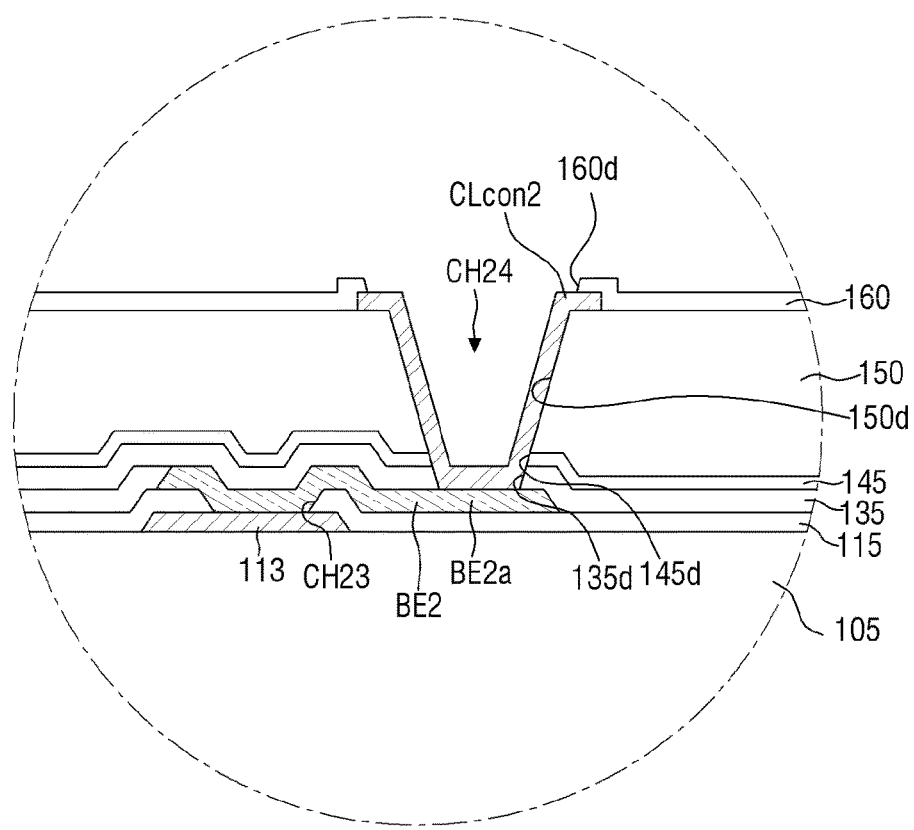
Figure 11:
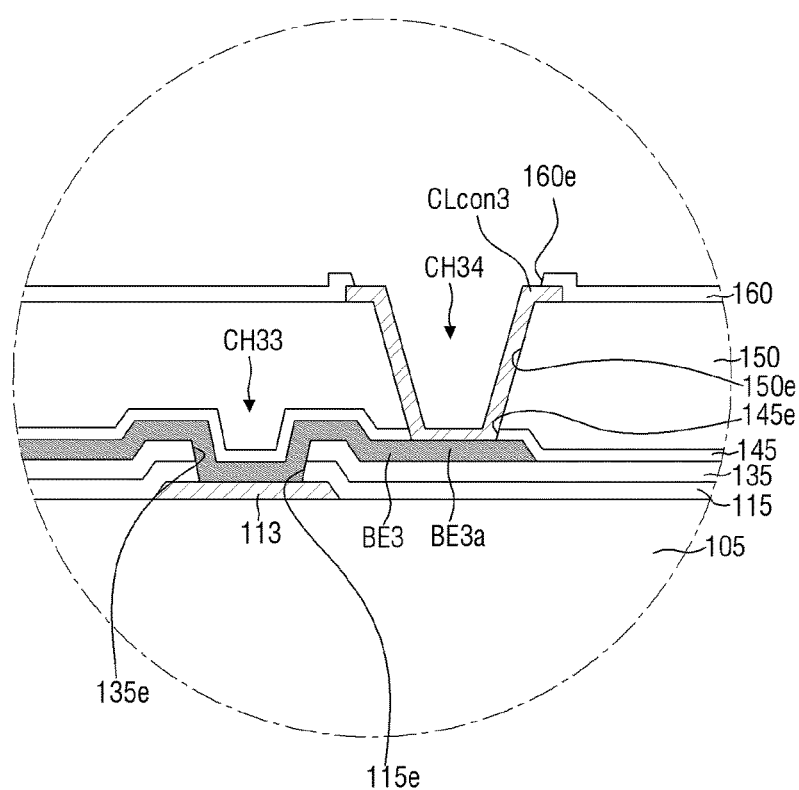

FIGS. 9 to 11 are cross-sectional views illustrating various examples for the electrical connection structure of the common wiring and the light blocking pattern of FIG. 8.

FIG. 9 illustrates the direct connection between the connection terminal 113a of the light blocking pattern 110 and the common wiring (CL of FIG. 7).

Specifically, the connection terminal 113a of the light blocking pattern 110 is formed to extend along the first direction D1 from the coupling portion 111 of the light blocking pattern 110 so as to overlap the common wiring (CL of FIG. 7) in the non-display area NDA of the first substrate 105.

Also, a single contact hole CH13 is formed to connect the connection terminal 113a of the light blocking pattern 110 and the common wiring (CL of FIG. 7). The contact hole CH13 may be formed by the through hole 115c of the buffer layer 115 for exposing the connection terminal 113a of the light blocking pattern 110, the through hole 135c of the interlayer insulating layer 135, the through hole 145c of the first passivation layer 145, and the through hole 150c of the planarization layer 150.

Also, the common wiring (CL of FIG. 7) is disposed so that the connection portion CLcon1 is electrically connected to the connection terminal 113a of the light blocking pattern 110 via the contact hole CH13. The second passivation layer 160 may include a contact hole 160c for exposing the connection portion CLcon1 of the common wiring (CL of FIG. 7).

FIG. 10 illustrates the connection of the connection terminal 113 of the light blocking pattern 110 to the common wiring (CL of FIG. 7) via the bridge electrode BE2 that is disposed in the same layer as the gate wiring GLi.

Specifically, the buffer layer 115 further includes a contact hole CH23 for exposing the connection terminal 113 of the light blocking pattern 110. As such, the bridge electrode BE2 is connected to the connection terminal 113 of the light blocking pattern 110 via the contact hole CH23, and is disposed to extend in the first direction D1 in the non-display area NDA of the first substrate 105. The interlayer insulating layer 135 is disposed on the buffer layer 115 so as to cover the bridge electrode BE2, and includes a through hole 135d for exposing the connection portion BE2a, which does not overlap the connection terminal 113 of the light blocking pattern 110, of the bridge electrode BE2. The first passivation layer 145 includes a through hole 145d that overlaps the through hole 135d of the interlayer insulating layer 135. The planarization layer 150 includes a through hole 150d that overlaps the through hole 145d of the first passivation layer 145. The through holes 135d, 145d, 150d may form a contact hole CH24.

Also, the common wiring (CL of FIG. 7) is formed so that the connection portion CLcon2 is connected to the connection portion BE2a of the bridge electrode BE2 via the contact hole CH24. The second passivation layer 160 may include a contact hole 160d for exposing the connection portion CLcon2 of the common wiring CL.

FIG. 11 illustrates the connection of the connection terminal 113 of the light blocking pattern 110 to the common wiring (CL of FIG. 7) via the bridge electrode BE3 that is disposed in the same layer as the data wiring DLj.

Specifically, the buffer layer 115 includes a through hole 115e for exposing the connection terminal 113 of the light blocking pattern 110, and the interlayer insulating layer 135 includes a through hole 135e that overlaps the through hole 115e of the buffer layer 115 while exposing the connection terminal 113 of the light blocking pattern 110. The through holes 115e, 135e may form a contact hole CH33. As such, the bridge electrode BE3 is electrically connected to the connection terminal 113 of the light blocking pattern 110 via the contact hole CH33, and is disposed to extend along the first direction D1 in the non-display area NDA of the first substrate 105. The first passivation layer 145 is disposed on the interlayer insulating layer 135 so as to cover the bridge electrode BE3, and includes a through hole 145e for exposing the connection portion BE3a, which does not overlap the connection terminal 113 of the light blocking pattern 110, of the bridge electrode BE3. The planarization layer 150 includes a through hole 150e that overlaps the through hole 145e of the first passivation layer 145. The through holes 145e, 150e may form a contact hole CH34.

Also, the common wiring CL is formed so that the connection portion CLcon3 is electrically connected to the connection portion BE3a of the bridge electrode BE3 via the contact hole CH34. The second passivation layer 160 may include a contact hole 160e for exposing the connection portion CLcon3 of the common wiring CL.

As described above, the display device 500 according to an embodiment of the present inventive concept includes the light blocking pattern 110 that prevents the light from entering the channel area 122 of the semiconductor layer 120 and also that is maintained at predetermined voltage, the common voltage. When the common voltage is applied to the common electrode CE, a resistance component may be reduced, and it is possible to reduce the formation of parasitic capacitance of the light blocking pattern 110 with peripheral constituents, for example, the gate electrode GE, and the source area 121 or the drain area 123 of the semiconductor pattern 120. Thus, a ripple phenomenon, in which the common voltage applied to the common electrode CE swings when the data voltage applied to the pixel electrode PE swings, may be decreased, and deterioration of the characteristics of the thin film transistor TFT1 as a switching element due to such parasitic capacitance may be prevented, thereby preventing the operational reliability of the display device 500 from decreasing.

Also, the display device 500 according to an embodiment of the present inventive concept is configured such that, in the area in which light blocking recess 112H of the light blocking pattern 110 overlaps the gate recess GH of the gate wiring GLi, the contact hole CH2 for connecting the pixel electrode PE to the semiconductor layer 120 and the thin film transistor TFT1 that overlaps some of the data wiring DLj are arranged parallel to each other in the first direction D1, whereby formation of parasitic capacitance of the light blocking pattern 110 with the peripheral electrodes may be reduced and an increase in the width of the light blocking member 210 that overlaps the contact hole CH2 and the thin film transistor TFT1 in the second direction D2 may be decreased. Hence, the aperture ratio of the pixels may increase.

Also, the display device 500 according to an embodiment of the present inventive concept is configured such that the drain area 123 of the semiconductor pattern 120 is in direct contact with the pixel electrode PE without drain electrode, and thus parasitic capacitance between the additional drain electrode and the gate electrode may be decreased. Therefore, deterioration of the characteristics of the thin film transistor TFT1 as a switching element due to the parasitic capacitance may be prevented, thereby preventing operational reliability of the display device 500 from decreasing.

Figure 12:
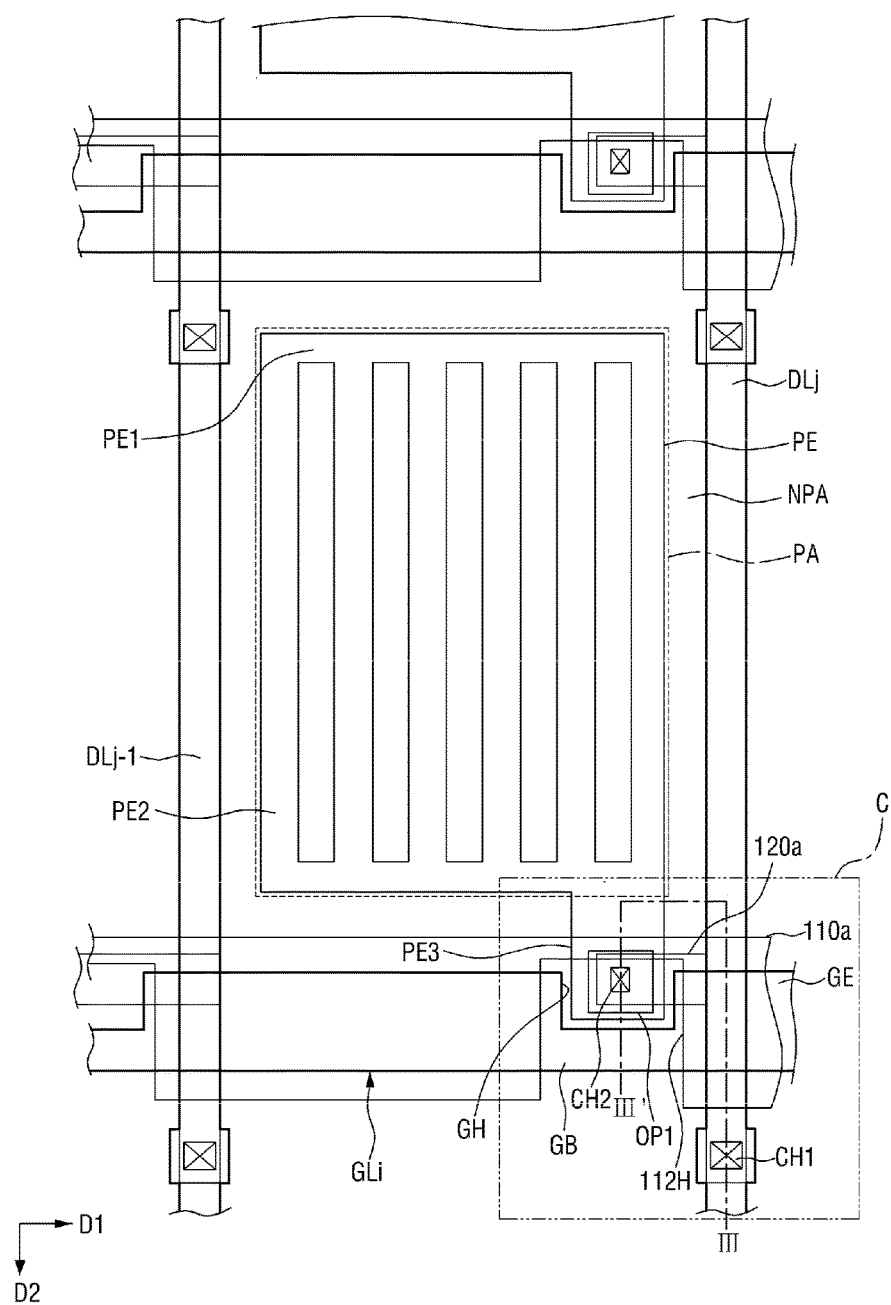
FIG. 12 is a layout view of a portion of a display device according to another embodiment of the present inventive concept, corresponding to FIG. 2.
Figure 13:
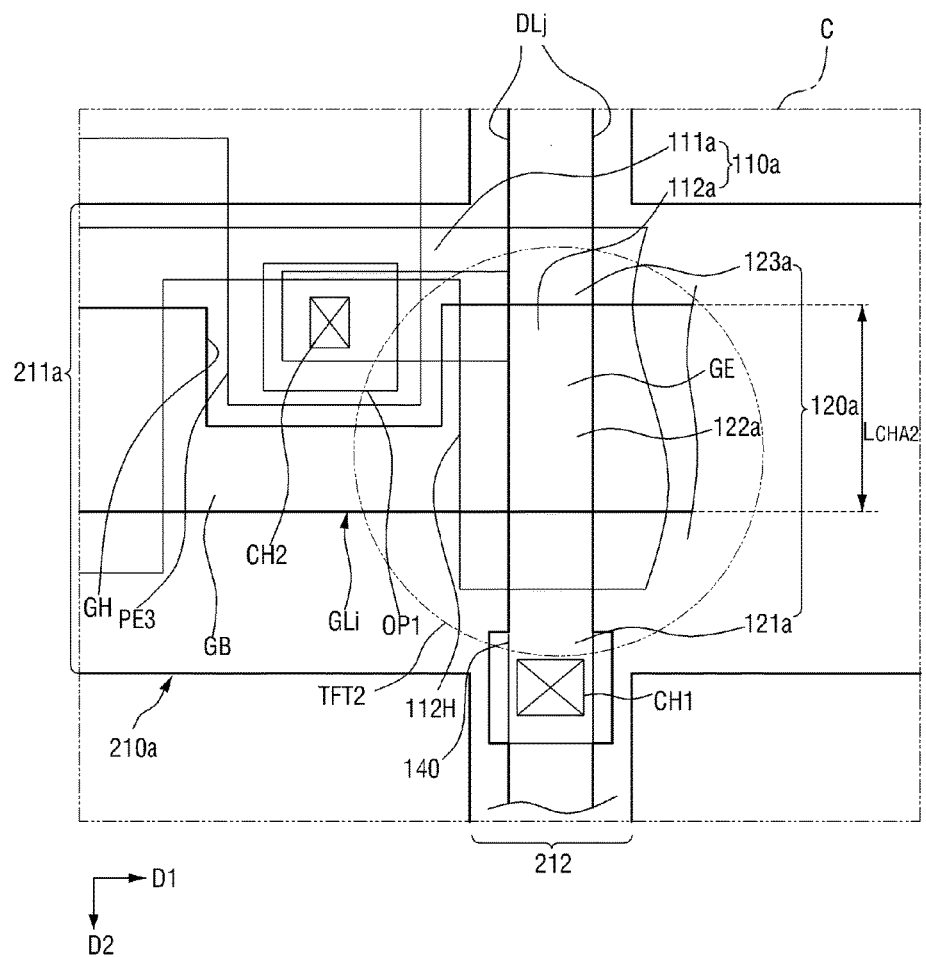
FIG. 13 is an enlarged layout view of Part 'C' of FIG. 12.
Figure 14:
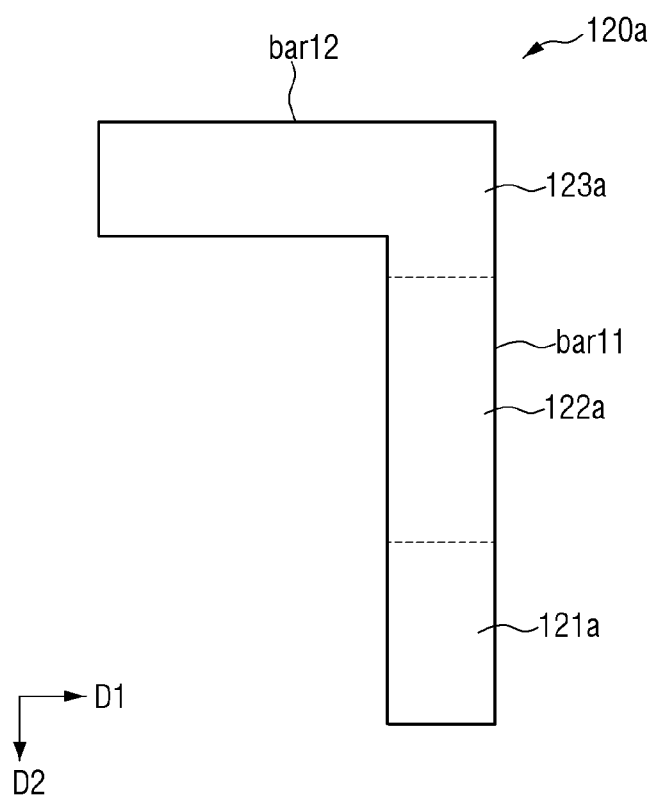
FIG. 14 is a top plan view illustrating the semiconductor pattern of FIG. 13.
Figure 15:
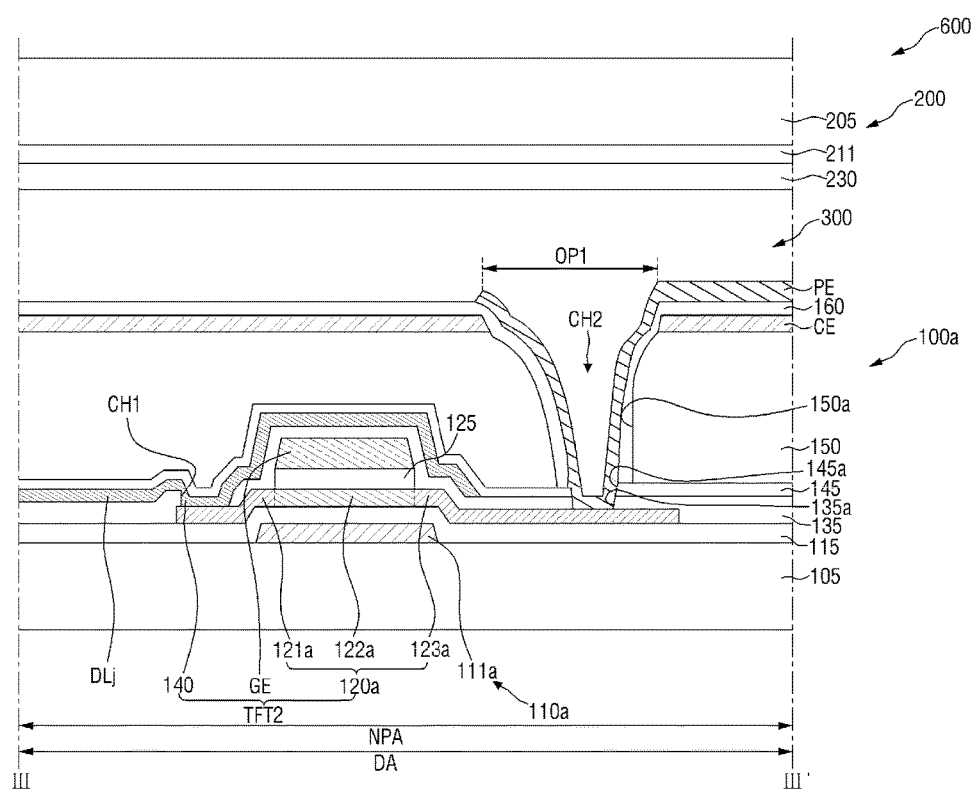
FIG. 15 is a cross-sectional view taken along the line III-III' of FIG. 12.

FIG. 12 is a layout view of a portion of a display device according to another embodiment of the present inventive concept, corresponding to FIG. 2, FIG. 13 is an enlarged layout view of Part 'C' of FIG. 12, FIG. 14 is a top plan view illustrating the semiconductor pattern of FIG. 13, and FIG. 15 is a cross-sectional view taken along the line III-III' of FIG. 12.

With reference to FIGS. 12 to 15, the display device 600 according to another embodiment of the present inventive concept has the same construction as the display device 500 of FIGS. 1 to 11, with the exception of the light blocking pattern 110a and the semiconductor pattern 120a of the first display substrate 100a. Thus, in the display device 600 according to another embodiment of the present inventive concept, only the light blocking pattern 110a and the semiconductor pattern 120a of the first display substrate 100a are described below.

The first display substrate 100a includes a first substrate 105, a light blocking pattern 110a, a buffer layer 115, a semiconductor pattern 120a, a gate insulating layer 125, a gate wiring GLi, an interlayer insulating layer 135, a data wiring DLj, a first passivation layer 145, a planarization layer 150, a common electrode CE, a second passivation layer 160, and a pixel electrode PE.

The light blocking pattern 110a is formed in the non-pixel area NPA of the first substrate 105, and is similar to the light blocking pattern 110 of FIG. 3. The light blocking pattern 110a may include a coupling portion 111a extending along the first direction D1, and protrusion portions 112a protruding in the second direction D2 from the coupling portion 111a.

The coupling portion 111a is similar to the coupling portion 111 of FIG. 3. Compared to the coupling portion 111 of FIG. 3, the coupling portion 111a may be disposed to be closer to the gate wiring GLi in the second direction D2.

The protrusion portions 112a are similar to the protrusion portions 112 of FIG. 3. The protrusion portions 112a may have a small width in the second direction D2, compared to the protrusion portions 112 of FIG. 3.

The semiconductor pattern 120a is formed in the non-pixel area NPA of the first substrate 105, and includes a source area 121a, a channel area 122a, and a drain area 123a, which are continuous, and is similar to the semiconductor pattern 120 of FIG. 3.

As illustrated in FIG. 14, the semiconductor pattern 120a may have a bending structure including a first portion bar11 and a second portion bar12. The first portion bar11 overlaps the data wiring DLj while extending along which the data wiring DLj extends, and may be formed by the source area 121a, the channel area 122a, and a portion of the drain area 123a. The length of the first portion bar11 in the second direction D2 may be greater than the width of the gate electrode GE. Also, the length of the first portion bar11 in the second direction D2 may be shorter than the length of the first portion bar1 of FIG. 4. The second portion bar12 is connected to the first portion bar11 and extends in the first direction D1, and may form another portion of the drain area 123a.

The semiconductor pattern 120a, the gate electrode GE, the source electrode area 140 may constitute a thin film transistor TFT2 that overlaps the data wiring DLj. As such, the channel length Lcha2 of the thin film transistor TFT2 may be the same as the width of the gate wiring GLi including the gate electrode GE in the second direction D2.

When the coupling portion 111a of the light blocking pattern 110a is closer to the gate wiring GLi in the second direction D2 and the length of the first portion bar11 is shorter in the second direction D2, the occupied area of the thin film transistor TFT2, including the semiconductor pattern 120a, the gate electrode GE, and the source electrode area 140, in the non-pixel area NPA may decrease, and the width of the first light blocking portion 211a, which overlaps the light blocking pattern 110a and the gate wiring GLi, of the light blocking member 210 of the second display substrate 200 may decrease in the second direction D2. Accordingly, the aperture ratio of pixels may increase.

As described above, the display device 600 according to another embodiment of the present inventive concept exhibits the same effects as the display device 500 of FIGS. 1 to 11.

The display device 600 according to another embodiment of the present inventive concept is configured to include the thin film transistor TFT2, the gate wiring GLi, and the light blocking pattern 110a, the occupied area of which is smaller in the non-pixel area NPA, whereby an increase in the width of the light blocking member 210 overlapping the contact hole CH2 and the thin film transistor TFT2 in the second direction D2 may be decreased. Thus, the aperture ratio of pixels may be increased.

Figure 16:
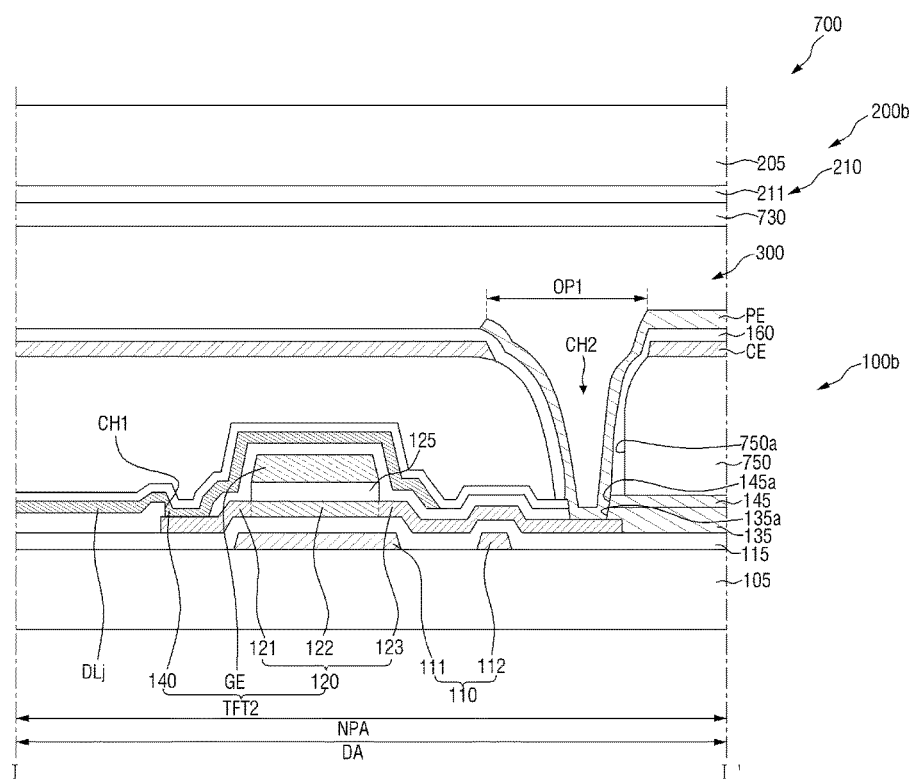
FIGS. 16 and 17 are cross-sectional views illustrating a portion of a display device according to a further embodiment of the present inventive concept, corresponding to FIGS. 5 and 6.
Figure 17:
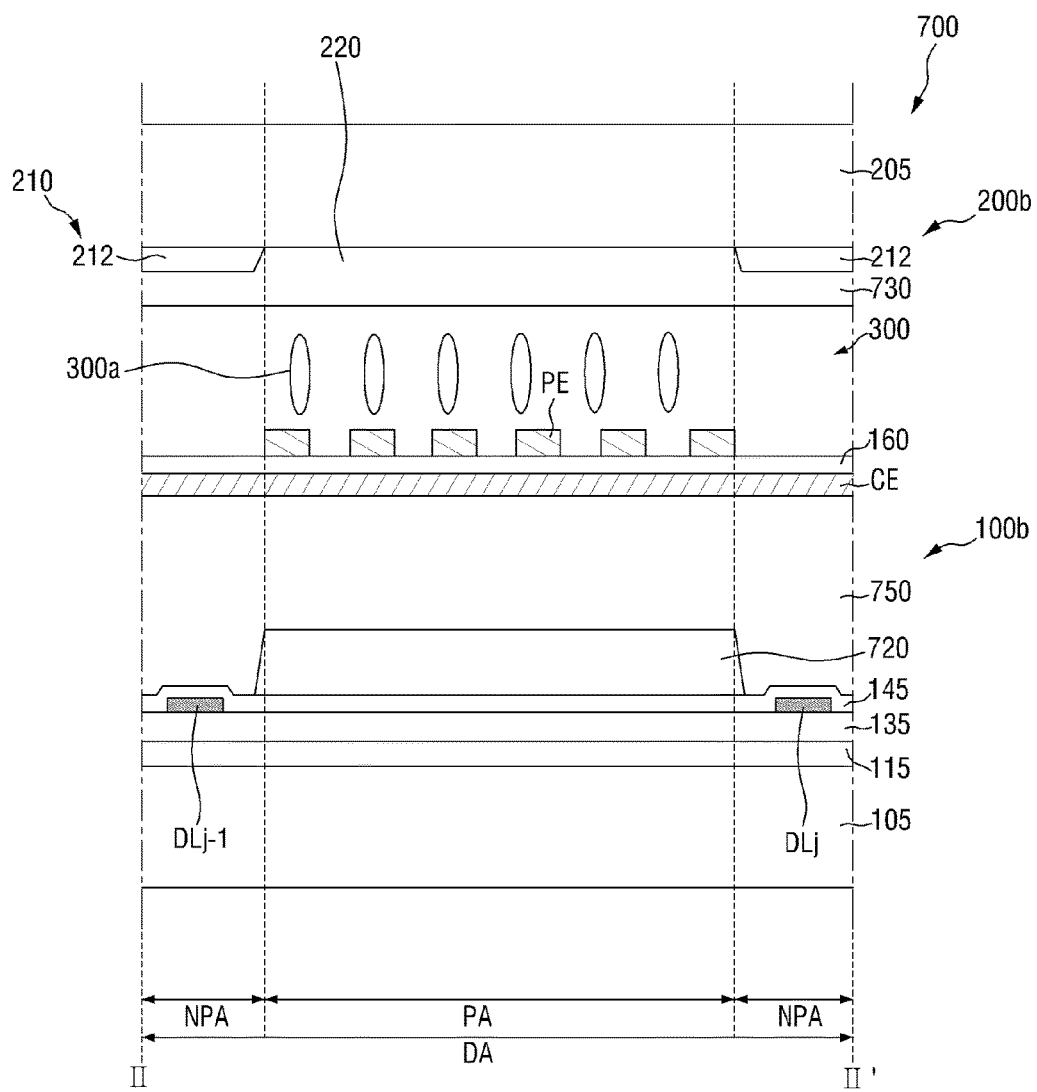

FIGS. 16 and 17 are cross-sectional views illustrating a portion of a display device according to still another embodiment of the present inventive concept, corresponding to FIGS. 5 and 6.

With reference to FIGS. 16 and 17, the display device 700 according to still another embodiment of the present inventive concept is configured such that the color filter 720 is disposed on the first display substrate 100b, unlike the display device 500 of FIGS. 1 to 11. Thus, in the display device 700 according to still another embodiment of the present inventive concept, differences depending on the configuration of the color filter 720 is described below.

The display device 700 may include a first display substrate 100b, a second display substrate 200b facing the first display substrate 100b, and a liquid crystal layer 300 interposed between the first display substrate 100b and the second display substrate 200b.

The first display substrate 100b includes a first substrate 105, a light blocking pattern 110, a buffer layer 115, a semiconductor pattern 120, a gate insulating layer 125, a gate wiring GLi, an interlayer insulating layer 135, a data wiring DLj, a first passivation layer 145, a color filter 720, a planarization layer 750, a common electrode CE, a second passivation layer 160, and a pixel electrode PE.

The color filter 720 is similar to the color filter 220 of FIG. 6. The color filter 720 is interposed between the first passivation layer 145 and the planarization layer 750.

The planarization layer 750 includes a through hole 750a overlapping the through hole 145a of the first passivation layer 145, and is similar to the planarization layer 150 of FIG. 6. The planarization layer 750 is disposed on the first passivation layer 145 so as to cover the color filter 720.

The second display substrate 200b may include a second substrate 205, a light blocking member 210, and an overcoating layer 730.

The overcoating layer 730 is similar to the overcoating layer 230 of FIG. 6. The overcoating layer 730 may be formed so as to cover only the light blocking member 210 because the color filter 720 is disposed between the first passivation layer 145 and the planarization layer 750. As necessary, the overcoating layer 730 may be omitted.

As described above, the display device 700 according to still another embodiment of the present inventive concept is different from the display device 500 in terms of a color-filter-on-array (COA) structure, but may exhibit the same effects.

Figure 18:
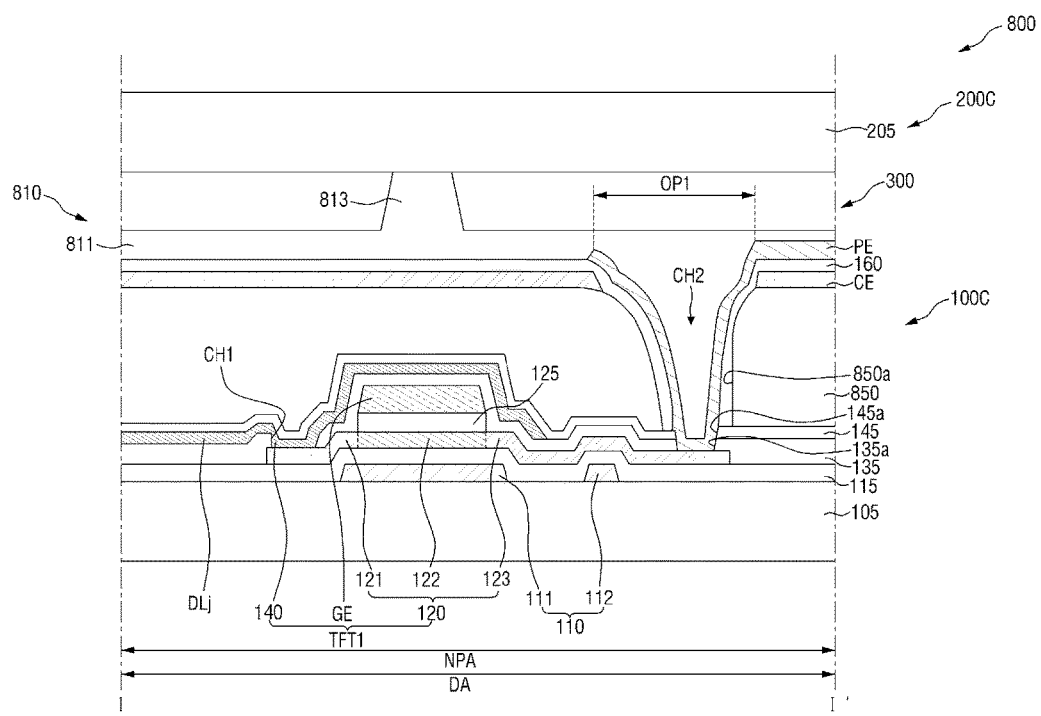
FIGS. 18 and 19 are cross-sectional views illustrating a portion of a display device according to still a further embodiment of the present inventive concept, corresponding to FIGS. 5 and 6.
Figure 19:
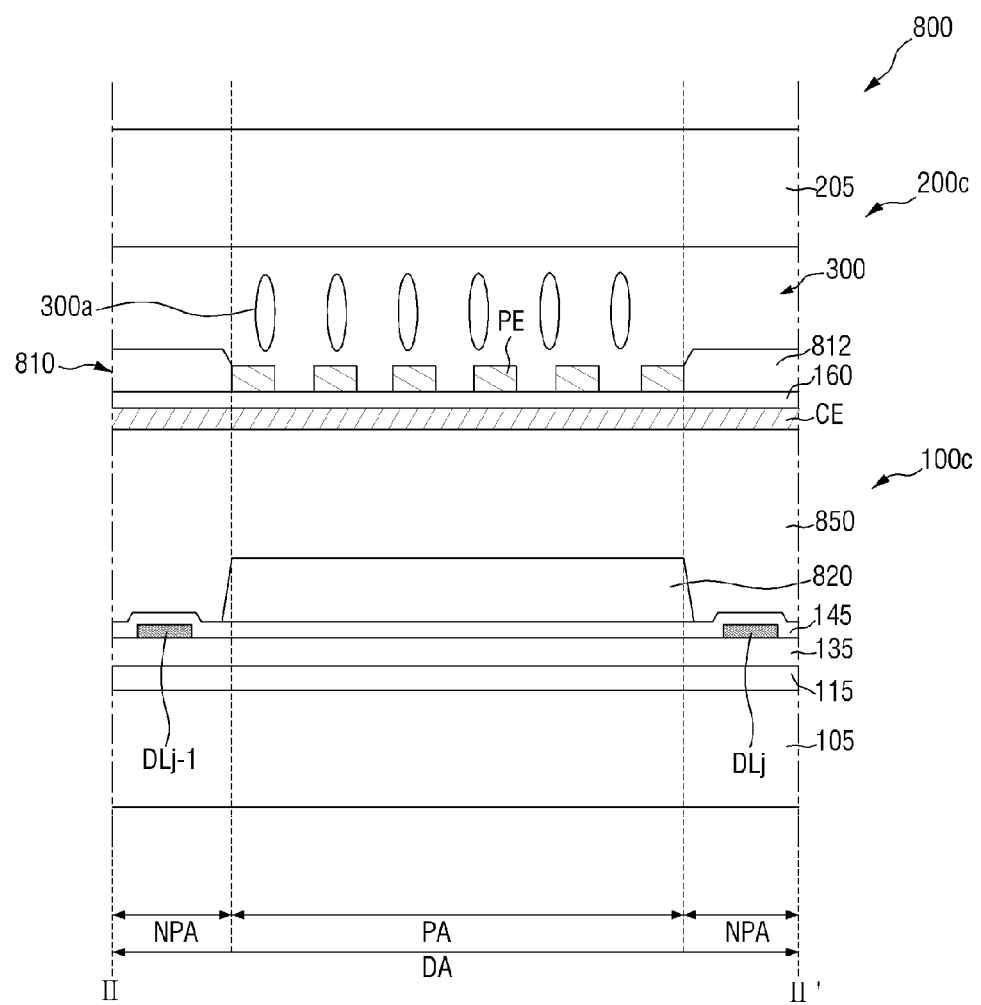

FIGS. 18 and 19 are cross-sectional views illustrating a portion of a display device according to yet another embodiment of the present inventive concept, corresponding to FIGS. 5 and 6.

With reference to FIGS. 18 and 19, the display device 800 according to yet another embodiment of the present inventive concept is configured such that the light blocking member 810 and the color filter 820 are disposed on the first display substrate 100c and the column spacer 813 is disposed on the light blocking member 810, unlike the display device 500 of FIGS. 1 to 11. Thus, in the display device 800 according to yet another embodiment of the present inventive concept, differences depending on the configuration of the light blocking member 810, the column spacer 813 and the color filter 820 is described below.

The display device 800 may include a first display substrate 100c, a second display substrate 200c facing the first display substrate 100c, and a liquid crystal layer 300 interposed between the first display substrate 100c and the second display substrate 200c.

The first display substrate 100c includes a first substrate 105, a light blocking pattern 110, a buffer layer 115, a semiconductor pattern 120, a gate insulating layer 125, a gate wiring GLi, an interlayer insulating layer 135, a data wiring DLj, a first passivation layer 145, a color filter 820, a planarization layer 850, a common electrode CE, a second passivation layer 160, a pixel electrode PE, a light blocking member 810, and a column spacer 813.

The color filter 820 is similar to the color filter 220 of FIG. 6. The color filter 820 is interposed between the first passivation layer 145 and the planarization layer 850.

The planarization layer 850 includes a through hole 850a overlapping the through hole 145a of the first passivation layer 145, and is similar to the planarization layer 150 of FIG. 6. The planarization layer 850 is disposed on the first passivation layer 145 so as to cover the color filter 820.

The light blocking member 810 includes first light blocking portions 811 and second light blocking portions 812, and is similar to the light blocking member 210 of FIG. 6. The light blocking member 810 may be disposed on the second passivation layer 160.

The column spacer 813 is disposed on the light blocking member 810, and functions to maintain the cell gap between the first display substrate 100c and the second display substrate 200c. The column spacer 813 may be located in the position corresponding to the thin film transistor TFT1, but the present inventive concept is not limited thereto. The column spacer 813 may be formed of the same material as the light blocking member 810, and may be integrally formed.

The second display substrate 200c includes a second substrate 205 because the color filter 820 and the light blocking member 810 are disposed on the first substrate 105. Thus, an overcoating layer may be omitted from the second display substrate 200c, and the end of the column spacer 813 may come into contact with the second substrate 205.

The display device 800 according to yet another embodiment of the present inventive concept is different from the display device 500 in terms of a black column spacer (BCS) structure, but may exhibit the same effects.

As described above, according to embodiments of the present inventive concept, the following effects are exhibited.

In the display device according to embodiments of the present inventive concept, the formation of parasitic capacitance between the light blocking pattern and the peripheral constituent can be reduced, thus improving the characteristics of the thin film transistor as a switching element, thereby increasing operational reliability of the display device.

Also, in the display device according to embodiments of the present inventive concept, an increase in the width of the light blocking member that overlaps the contact hole and the thin film transistor can be reduced, thus increasing the aperture ratio of pixels.

The effects of the present inventive concept are not limited by the foregoing, and other various effects are anticipated herein.

In concluding the detailed description, those skilled in the art will appreciate that many variations and modifications can be made to the preferred embodiments without substantially departing from the principles of the present inventive concept. Therefore, the disclosed preferred embodiments of the inventive concept are used in a generic and descriptive sense only and not for purposes of limitation.

What is claimed is:

1. A display device, comprising:
   a substrate including a display area and a non-display area surrounding the display area;
   a light blocking pattern disposed on the substrate and including a coupling portion extending in a first direction and a plurality of protrusion portions protruding in a second direction crossing the first direction from the coupling portion;
   a semiconductor pattern disposed on the light blocking pattern and including a source area, a channel area and a drain area;
   a gate insulating layer disposed on the semiconductor pattern;
   a gate wiring including a gate line extending in the first direction on the gate insulating layer and a gate electrode overlapping the channel area;
   an interlayer insulating layer formed on the gate wiring;
   a first contact hole for exposing the source area through the interlayer insulating layer;
   a data wiring extending in the second direction on the interlayer insulating layer and electrically connected to the source area via the first contact hole;
   a first passivation layer disposed on the data wiring;
   a second contact hole, which is disposed between the neighboring protrusion portions of the light blocking pattern so as not to overlap the light blocking pattern, and exposes the drain area through the interlayer insulating layer and the first passivation layer;
   a pixel electrode disposed on the first passivation layer and electrically connected to the drain area through the second contact hole;
   a common electrode, which is disposed between the first passivation layer and the pixel electrode and to which a common voltage is applied; and
   a common wiring, which is disposed in a closed loop shape in the non-display area and surrounds the display area, being electrically connected to the common electrode,
   wherein the coupling portion is connected to the common wiring which provides the common voltage,
   wherein the common electrode and the common wiring are disposed on directly on a same layer, and
   wherein the common electrode includes the same material as the common wiring.

2. The display device of claim 1, wherein the semiconductor layer comprises:
   a first portion, which includes the source area, the channel area, and a portion of the drain area, and overlaps the data wiring;
   a second portion, which forms another portion of the drain area, extends in the first direction, and is connected to the first portion.

3. The display device of claim 2, wherein the semiconductor layer further comprises:
   a third portion, which forms the another portion of the drain area, extends in the second direction, and faces the first portion.

4. The display device of claim 1, wherein the light blocking pattern further includes a light blocking recess recessed from an edge of the light blocking pattern,
   the gate wiring further includes a gate recess recessed from an edge of the gate wiring and overlapping the light blocking recess, and the second contact hole overlaps the gate recess and the light blocking recess.

5. The display device of claim 1, wherein the light blocking pattern further includes a connection terminal extending in the first direction from the coupling portion to a non-display area.

6. The display device of claim 5, further comprising:
a planarization layer disposed between the first passivation layer and the pixel electrode;
the common wiring disposed to be insulated from the pixel electrode and including a connection portion;
a second passivation layer disposed between the common wiring and the pixel electrode;
a third contact hole for exposing the connection terminal through the second passivation layer, the planarization layer, the first passivation layer, and the interlayer insulating layer;
a fourth contact hole for exposing the connection portion through the second passivation layer; and
a bridge electrode disposed on the same layer as the pixel electrode, and disposed to electrically connect the connection terminal and the connection portion through the third contact hole and the fourth contact hole.

7. The display device of claim 5, further comprising:
a planarization layer disposed between the first passivation layer and the pixel electrode;
the common wiring disposed to be insulated from the pixel electrode and including a connection portion; and
a third contact hole for exposing the connection terminal through the planarization layer, the first passivation layer, and the interlayer insulating layer,
wherein the connection portion is electrically connected to the connection terminal through the third contact hole.

8. The display device of claim 5, further comprising:
a buffer layer disposed between the light blocking pattern and the semiconductor layer;
a planarization layer disposed between the first passivation layer and the pixel electrode;
the-common wiring disposed to be insulated from the pixel electrode and including a connection portion;
a third contact hole for exposing the connection terminal through the buffer layer;
a bridge electrode disposed on the same layer as the gate wiring and electrically connected to the connection terminal through the third contact hole; and
a fourth contact hole for exposing the bridge electrode through the planarization layer, the first passivation layer, and the interlayer insulating layer,
wherein the connection portion is electrically connected to the bridge electrode through the fourth contact hole.

9. The display device of claim 5, further comprising:
a buffer layer disposed between the light blocking pattern and the semiconductor layer;
a planarization layer disposed between the first passivation layer and the pixel electrode;
the common wiring disposed to be insulated from the pixel electrode and including a connection portion;
a third contact hole for exposing the connection terminal through the buffer layer and the interlayer insulating layer;
a bridge electrode disposed on the same layer as the data wiring and electrically connected to the connection terminal through the third contact hole; and
a fourth contact hole for exposing the bridge electrode through the planarization layer and the first passivation layer,
wherein the connection portion is electrically connected to the bridge electrode through the fourth contact hole.

10. The display device of claim 1, wherein the light blocking pattern is formed of a metal material.

11. The display device of claim 1, wherein the first contact hole overlaps the source area and the data wiring.

12. A display device, comprising:
a substrate including a display area including a plurality of pixels arranged in a matrix shape in a first direction and a second direction perpendicular to the first direction, and a non-display area surrounding the display area;
a light blocking pattern disposed at each row of the pixels on the substrate;
a first insulating layer disposed on the light blocking pattern;
a common electrode, which is disposed on the first insulating layer and to which a common voltage is applied;
a pixel electrode, which is disposed at each of the pixels on the first insulating layer and to which a pixel voltage is applied; and
a common wiring, which is disposed in a closed loop shape in the non-display area and surrounds the display area, electrically connected to the common electrode,
wherein the light blocking pattern includes a coupling portion extending in the first direction and a plurality of protrusion portions protruding in the second direction from the coupling portion,
wherein the coupling portion is connected to the common wiring which provides the common voltage,
wherein the common voltage is applied to the light blocking pattern,
wherein the common electrode and the common wiring are disposed on directly on a same layer, and
wherein the common electrode includes the same material as the common wiring.

13. The display device of claim 12, further comprising a first contact hole for exposing the light blocking pattern through the first insulating layer outside the display area, wherein the light blocking pattern is electrically connected to the common electrode through the first contact hole.

14. The display device of claim 13, further comprising:
a second insulating layer disposed between the common electrode and the pixel electrode;
a common wiring, which is disposed in the same layer as the common electrode outside the display area, includes a connection portion, and is electrically connected to the common electrode;
a second contact hole for exposing the connection portion through the second insulating layer; and
a bridge electrode formed in the same layer as the pixel electrode and configured to connect the light blocking pattern and the connection portion through the first contact hole and the second contact hole.

15. The display device of claim 14, wherein the light blocking pattern further includes a connection terminal extending from the coupling portion along the first direction to outside the display area and exposed by the first contact hole, and the connection terminal is electrically connected to the bridge electrode.

16. The display device of claim 13, further comprising:
a second insulating layer disposed between the common electrode and the pixel electrode; and
a common wiring, which is disposed on the same layer as the common electrode and disposed outside the display area, including a connection portion and being electrically connected to the common electrode,
wherein the light blocking pattern is electrically connected to the connection portion through the first contact hole.

17. The display device of claim 16, wherein the light blocking pattern further includes a connection terminal extending from the coupling portion along the first direction to outside the display area and exposed by the first contact hole, and the connection terminal is electrically connected to the connection portion.

18. The display device of claim 12, wherein the light blocking pattern is formed of a metal material.

* * * * *